United States Patent
Na et al.

(10) Patent No.: US 10,378,887 B2
(45) Date of Patent: Aug. 13, 2019

(54) META PROJECTORS EMITTING STRUCTURED LIGHT OR UNIFORM LIGHT BASED ON POLARIZATION OF INCIDENT LIGHT AND ELECTRONIC APPARATUSES INCLUDING THE SAME

(71) Applicant: Samsung Electronics Co., Ltd., Suwon-si, Gyeonggi-do (KR)

(72) Inventors: Byunghoon Na, Suwon-si (KR); Jangwoo You, Seoul (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/933,627

(22) Filed: Mar. 23, 2018

(65) Prior Publication Data
US 2019/0137856 A1   May 9, 2019

(30) Foreign Application Priority Data
Nov. 7, 2017   (KR) .......................... 10-2017-0147616

(51) Int. Cl.
*G01B 11/25*   (2006.01)
*G03B 21/20*   (2006.01)
(Continued)

(52) U.S. Cl.
CPC ............ *G01B 11/25* (2013.01); *G01B 11/254* (2013.01); *G01B 11/2504* (2013.01);
(Continued)

(58) Field of Classification Search
CPC . G01B 11/25; G01B 11/2513; G01B 11/2504; G01B 11/2509; G01B 11/2518;
(Continued)

(56) References Cited

U.S. PATENT DOCUMENTS 7,001,024 B2 * 2/2006 Kitaguchi .............. G03B 21/26
  348/135
7,651,225 B2 * 1/2010 Nishikawa ............ G02B 27/22
  353/7

(Continued)

FOREIGN PATENT DOCUMENTS

KR       101032499 B1   5/2011
KR       101051434 B1   7/2011
KR   10-2017-0112915 A  10/2017

OTHER PUBLICATIONS

Phys. Rev. B82, 235405 dated Dec. 2, 2012.
(Continued)

*Primary Examiner* — Bao-Luan Q Le
(74) *Attorney, Agent, or Firm* — Sughrue Mion, PLLC

(57) ABSTRACT

A meta projector includes a light source array configured to emit light along an optical path. The light source array includes a first light-emitting array including a plurality of first light-emitting configured to emit first light having a first set of light properties and a second light-emitting array including a plurality of second light-emitting elements configured to emit a second light having a second set of light properties, the second set of light properties different from the first set of light properties. The meta projector includes a meta-structure layer aligned with the optical path. The meta projector includes a plurality of nanostructures having a sub-wavelength shape dimension that is smaller than a wavelength of light emitted from the light source array. The meta-structure layer is configured to differently modulate the first light and the second light in relation to each other.

29 Claims, 12 Drawing Sheets

(51) Int. Cl.
*G02B 27/28* (2006.01)
*G06K 9/00* (2006.01)
*G06F 21/31* (2013.01)

(52) U.S. Cl.
CPC ...... *G01B 11/2509* (2013.01); *G01B 11/2513* (2013.01); *G01B 11/2518* (2013.01); *G01B 11/2522* (2013.01); *G01B 11/2527* (2013.01); *G01B 11/2531* (2013.01); *G01B 11/2536* (2013.01); *G01B 11/2545* (2013.01); *G02B 27/28* (2013.01); *G03B 21/2013* (2013.01); *G03B 21/2073* (2013.01); *G06F 21/31* (2013.01); *G06K 9/00288* (2013.01); *G06K 9/00617* (2013.01)

(58) Field of Classification Search
CPC ............ G01B 11/2522; G01B 11/2527; G01B 11/2531; G01B 11/2536; G01B 11/254; G01B 11/2545; G06T 7/521; A61C 9/006; A61C 9/0066; A61C 9/0073; G06K 9/2036
See application file for complete search history.

(56) References Cited

U.S. PATENT DOCUMENTS

| | | | | |
|---|---|---|---|---|
| 7,845,807 B2* | 12/2010 | Iwasaki | .................... | F21K 9/00 345/82 |
| 8,599,484 B2* | 12/2013 | Miyasaka | ........... | G02B 5/1861 356/603 |
| 8,637,840 B2* | 1/2014 | Lee | ...................... | G02B 5/1838 250/504 R |
| 8,705,043 B2* | 4/2014 | Lee | ......................... | G06T 7/521 356/457 |
| 8,708,497 B2* | 4/2014 | Tsuyuki | ................. | G01B 11/25 353/7 |
| 8,749,796 B2* | 6/2014 | Pesach | .................. | G01B 11/25 356/610 |
| 8,878,905 B2* | 11/2014 | Fisker | .................. | A61B 5/0068 348/46 |
| 8,908,277 B2* | 12/2014 | Pesach | .................. | G01B 11/25 359/619 |
| 9,068,823 B2* | 6/2015 | Lee | ......................... | G06T 7/521 |
| 9,091,413 B2* | 7/2015 | Petronius | ................ | B23P 11/00 |
| 9,360,306 B2* | 6/2016 | Park | ..................... | G01B 11/254 |
| 9,740,019 B2 | 8/2017 | Mor | | |
| 9,746,318 B2* | 8/2017 | Sugano | .................. | G01B 11/25 |
| 9,769,455 B2* | 9/2017 | Fisker | .................. | A61B 5/0062 |
| 9,857,167 B2* | 1/2018 | Jovanovski | ........... | G02B 26/10 |
| 9,897,438 B2* | 2/2018 | Miyasaka | .............. | G01B 11/25 |
| 2002/0113946 A1* | 8/2002 | Kitaguchi | ............. | G03B 21/26 353/28 |
| 2007/0019166 A1* | 1/2007 | Iwasaki | ..................... | F21K 9/00 353/34 |
| 2008/0013049 A1* | 1/2008 | Nishikawa | ............. | G02B 27/22 353/7 |
| 2010/0268069 A1* | 10/2010 | Liang | ...................... | G06T 7/521 600/425 |
| 2010/0311005 A1 | 12/2010 | Liang | | |
| 2011/0042587 A1* | 2/2011 | Lee | ...................... | G02B 5/1838 250/492.2 |
| 2011/0141483 A1* | 6/2011 | Lee | .................... | G01B 11/0608 356/511 |
| 2011/0188054 A1* | 8/2011 | Petronius | ................ | B23P 11/00 356/610 |
| 2012/0038934 A1* | 2/2012 | Miyasaka | .......... | G01B 11/2513 356/610 |
| 2012/0092461 A1* | 4/2012 | Fisker | .................. | A61B 5/0068 348/46 |
| 2013/0038881 A1* | 2/2013 | Pesach | .................. | G01B 11/25 356/610 |
| 2013/0038941 A1* | 2/2013 | Pesach | .................. | G01B 11/25 359/619 |
| 2014/0022356 A1* | 1/2014 | Fisker | .................. | A61B 5/0062 348/47 |
| 2014/0198320 A1* | 7/2014 | Park | ....................... | G01B 11/25 356/610 |
| 2014/0211084 A1* | 7/2014 | Petronius | ................ | B23P 11/00 348/373 |
| 2014/0211215 A1* | 7/2014 | Pesach | .................. | G01B 11/25 362/235 |
| 2014/0226165 A1* | 8/2014 | Lee | .................... | G01B 11/0608 356/601 |
| 2014/0320605 A1* | 10/2014 | Johnson | ............. | G01B 11/2513 348/47 |
| 2014/0376092 A1 | 12/2014 | Mor | | |
| 2015/0054922 A1* | 2/2015 | Fisker | .................. | A61B 5/0068 348/46 |
| 2015/0145987 A1* | 5/2015 | Sugano | .................. | G01B 11/25 348/135 |
| 2015/0292709 A1* | 10/2015 | Petronius | ................ | B23P 11/00 348/222.1 |
| 2015/0347833 A1* | 12/2015 | Robinson | ............... | G01B 11/25 348/77 |
| 2016/0164258 A1* | 6/2016 | Weichmann | ........ | H01S 5/18355 382/154 |
| 2016/0178358 A1* | 6/2016 | Miyasaka | .............. | G01B 11/25 356/610 |
| 2016/0197452 A1 | 7/2016 | Mor | | |
| 2016/0220104 A1* | 8/2016 | Bauer | .................. | A61B 1/0646 |
| 2016/0377417 A1* | 12/2016 | Jovanovski | ............ | G02B 26/10 348/136 |
| 2017/0003122 A1* | 1/2017 | Pesach | .................. | G01B 11/25 |
| 2017/0314763 A1* | 11/2017 | Petronius | ................ | B23P 11/00 |
| 2017/0374350 A1* | 12/2017 | Fisker | .................. | A61B 5/0062 |
| 2018/0023947 A1* | 1/2018 | Meng | .................... | G01B 11/25 348/46 |
| 2018/0231373 A1* | 8/2018 | Pesach | .................. | G01B 11/25 |
| 2018/0322645 A1 | 11/2018 | Han et al. | | |

OTHER PUBLICATIONS

Communication dated Feb. 27, 2019, issued by the European Patent Office in counterpart European Application No. 18186699.7.
Filareti Tsalakanidou et al., "Real-time acquisition of depth and color images using structured light and its application to 3D face recognition", Real-Time Imaging, Academic Press Limited, vol. 11, No. 5-6, Oct. 1, 2005, pp. 358-369 (12 pages total).

* cited by examiner

META PROJECTORS EMITTING STRUCTURED LIGHT OR UNIFORM LIGHT BASED ON POLARIZATION OF INCIDENT LIGHT AND ELECTRONIC APPARATUSES INCLUDING THE SAME

CROSS-REFERENCE TO RELATED APPLICATION

This application claims the benefit, under 35 U.S.C. § 119, of Korean Patent Application No. 10-2017-0147616, filed on Nov. 7, 2017, in the Korean Intellectual Property Office, the disclosure of which is incorporated herein in its entirety by reference.

BACKGROUND

1. Field

The present disclosure relates to meta projectors and electronic apparatuses including one or more meta projectors.

2. Description of the Related Art

Various sensors such as iris sensors or depth sensors are used in mobile and wearable devices. In addition, there has been a continuing trend of reducing the sizes and power consumption of sensors used in applications such as tablet personal computers, drones, or Internet of Things (IoT).

Existing sensors use micro-optical techniques according to their functions and include illumination components configured to be used for applications such as projectors or scanners. Therefore, many light sources and optical components are required, and the volume occupied by such optical components is a factor affecting design precision and manufacturing conditions.

SUMMARY

Provided are meta projectors having a small size and configured to emit light with intended performance (e.g., structured light having a particular pattern).

Provided are electronic apparatuses including one or more of such meta projectors.

Additional aspects will be set forth in part in the description which follows and, in part, will be apparent from the description, or may be learned by practice of the presented embodiments.

According to some example embodiments, a meta projector may include a light source array configured to emit light along an optical path, the light source array including a first light-emitting array including a plurality of first light-emitting elements configured to emit first light having a first set of light properties, and a second light-emitting array including a plurality of second light-emitting elements configured to emit a second light having a second set of light properties, the second set of light properties different from the first set of light properties. The meta projector may include a meta-structure layer at least partially aligned with the optical path, the meta-structure layer including a plurality of nanostructures having a sub-wavelength shape dimension that is smaller than a wavelength of light emitted from the light source array, the meta-structure layer configured to differently modulate the first light and the second light in relation to each other.

The first set of light properties may include a first polarization state, and the second set of light properties may include a second polarization state, the second polarization state different from the first polarization state.

The first light-emitting array may include a plurality of first columns, the plurality of first columns including the plurality of first light-emitting elements, the second light-emitting array may include a plurality of second columns, the plurality of second columns including the plurality of second light-emitting elements, and the light source array may include an alternating pattern of the first columns and the second columns.

The plurality of nanostructures may be configured to form structured light using the first light emitted from the first light-emitting array based on a particular shape distribution of the plurality of nanostructures and form uniform light using the second light emitted from the second light-emitting array based on the particular shape distribution of the plurality of nanostructures.

The plurality of nanostructures may include a material having a refractive index greater than a refractive index of a material adjacent to the plurality of nanostructures.

A refractive index difference between the plurality of nanostructures and the material adjacent to the nanostructures may be 1 or greater.

The plurality of nanostructures may include a conductive material.

The plurality of nanostructures may be configured to form different transmission phase distributions according to a polarization of light emitted from the light source array, based on a particular shape distribution of the plurality of nanostructures.

The plurality of nanostructures may have an asymmetrical cross-sectional shape.

The plurality of nanostructures may have a shape dimension that is equal to or less than one-half of a wavelength of light emitted from the light source array.

The plurality of nanostructures may have an arrangement pitch that is equal to or less than one-half of a wavelength of light emitted from the light source array.

The meta-structure layer may further include a support layer configured to support the plurality of nanostructures, and the plurality of nanostructures may be on opposite sides of the support layer.

According to some example embodiments, a light source apparatus may include a light source array configured to emit light along an optical path, the light source array including a first light-emitting array including a plurality of first light-emitting elements configured to emit first light having a first polarization state, and a second light-emitting array including a plurality of second light-emitting elements configured to emit second light having a second polarization state, the second polarization state different from the first polarization state. The light source apparatus may include a meta-structure layer at least partially aligned with the optical path, the meta-structure layer including a plurality of nanostructures having a sub-wavelength shape dimension that is smaller than a wavelength of light emitted from the light source array. The meta-structure layer may be configured to form structured light using the first light based on the first polarization state of the first light, and form uniform light using the second light based on the second polarization state of the second light. The light source apparatus may include a controller configured to perform a control operation to selectively drive one light-emitting array of the first light-emitting array and the second light-emitting array.

According to some example embodiments, an object recognizing apparatus may include a meta projector configured to emit structured light or uniform light onto an object; a sensor configured to receive light reflected from the object; and a processor configured to control the meta projector to emit structured light or uniform light, and process the light received at the sensor to generate information indicating a shape of the object, wherein the meta projector includes a light source array configured to emit light, the light source array including a first light-emitting array including a plurality of first light-emitting elements configured to emit first light having a first polarization state, and a second light-emitting array including a plurality of second light-emitting elements configured to emit second light having a second polarization state, the second polarization state different from the first polarization state. The object recognizing apparatus may include a meta-structure layer including a plurality of nanostructures having a sub-wavelength shape dimension that is smaller than a wavelength of light emitted from the light source array. The meta-structure layer may be configured to form structured light using the first light based on the first polarization state of the first light, and form uniform light using the second light based on the second polarization state of the second light.

The processor may be configured to process the light received at the sensor to determine a three-dimensional shape of the object, based on controlling the meta projector to emit the structured light onto the object, such that the light received at the sensor is based on reflection of at least some of the structured light from the object, and process the light received at the sensor to determine a two-dimensional shape of the object, based on controlling the meta projector to emit the uniform light onto the object, such that the light received at the sensor is based on reflection of at least some of the uniform light from the object.

According to some example embodiments, an electronic apparatus may include a meta projector configured to emit light onto an object to enable user authentication, a sensor configured to receive light reflected from the object, and a processor configured to analyze the received light to determine whether to authenticate a user. The meta projector may include a light source array configured to emit light along an optical path, the light source array including a first light-emitting array including a plurality of first light-emitting elements configured to emit first light having a first set of light properties, and a second light-emitting array including a plurality of second light-emitting elements configured to emit a second light having a second set of light properties, the second set of light properties different from the first set of light properties. The meta projector may include a meta-structure layer at least partially aligned with the optical path, the meta-structure layer including a plurality of nanostructures having a sub-wavelength shape dimension that is smaller than a wavelength of light emitted from the light source array, the meta-structure layer configured to differently modulate the first light and the second light in relation to each other.

The first set of light properties may include a first polarization state, and the second set of light properties may include a second polarization state, the second polarization state different from the first polarization state.

The plurality of nanostructures may be configured to form structured light using the first light emitted from the first light-emitting array based on a particular shape distribution of the plurality of nanostructures, and form uniform light using the second light emitted from the second light-emitting array based on the particular shape distribution of the plurality of nanostructures.

The processor may be configured to control the meta projector according to user interact with a user interface or an execution of an application of the electronic apparatus to selectively operate one light-emitting array of the first light-emitting array and the second light-emitting array.

The processor may be configured to implement a face recognition method to enable user authentication based on the meta projector emitting structured light onto the object, and implement an iris recognition method to enable user authentication based on the meta projector emitting uniform light onto the object.

According to some example embodiments, a meta projector may include a light source array configured to emit light along an optical path, the light source array including a first light-emitting array including a plurality of first light-emitting elements configured to emit first light having a first set of light properties, and a second light-emitting array including a plurality of second light-emitting elements configured to emit a second light having a second set of light properties, the second set of light properties different from the first set of light properties. The meta projector may include a meta-structure layer at least partially aligned with the optical path, the meta-structure layer including a first plurality of nanostructures having a first sub-wavelength shape dimension that is smaller than a wavelength of light emitted from the light source array, and a second plurality of nanostructures having a second sub-wavelength shape dimension that is smaller than the wavelength of light emitted from the light source array, the second sub-wavelength shape dimension different from the first sub-wavelength shape dimension.

The first plurality of nanostructures and the second plurality of nanostructures may be collectively configured to form structured light using the first light emitted from the first light-emitting array based on a first shape distribution of the first plurality of nanostructures and a second shape distribution of the second plurality of nanostructures. The first plurality of nanostructures and the second plurality of nanostructures may be collectively configured to form uniform light using the second light emitted from the second light-emitting array based on the first shape distribution of the first plurality of nanostructures and the second shape distribution of the second plurality of nanostructures.

The first set of light properties may include a first polarization state, and the second set of light properties includes a second polarization state, the second polarization state different from the first polarization state.

The first light-emitting array may include a plurality of first columns, the plurality of first columns including the plurality of first light-emitting elements, the second light-emitting array may include a plurality of second columns, the plurality of second columns including the plurality of second light-emitting elements, and the light source array may include an alternating pattern of the first columns and the second columns.

The first plurality of nanostructures may include a first material having a first refractive index greater than a refractive index of a material adjacent to the first plurality of nanostructures, and the second plurality of nanostructures may include a second material having a second refractive index greater than the refractive index of the material adjacent to the first plurality of nanostructures, the second refractive index different from the first refractive index.

The meta-structure layer may further include a support layer configured to support the plurality of nanostructures, and the first plurality of nanostructures and the second plurality of nanostructures may be on opposite sides of the support layer, respectively.

According to some example embodiments, a meta projector may include a meta-structure layer configured to receive light emitted by light-emitting elements of a light source array. The meta-structure layer may include a plurality of nanostructures having a sub-wavelength shape dimension that is smaller than a wavelength of the light received from the light source array, such that the meta-structure layer is configured to differently modulate received light having different light properties.

The meta-structure layer may be configured to differently modulate received light having different polarization states.

The plurality of nanostructures may be configured to form structured light using received light having a first set of light properties based on a particular shape distribution of the plurality of nanostructures, and form uniform light using received light having a second set of light properties based on the particular shape distribution of the plurality of nanostructures, the second set of light properties different from the first set of light properties.

The plurality of nanostructures may include a material having a refractive index greater than a refractive index of a material adjacent to the plurality of nanostructures.

A refractive index difference between the plurality of nanostructures and the material adjacent to the nanostructures may be 1 or greater.

The plurality of nanostructures may include a conductive material.

The plurality of nanostructures may be configured to form different transmission phase distributions according to a polarization of light emitted from the light source array, based on a particular shape distribution of the plurality of nanostructures.

The plurality of nanostructures may have an asymmetrical cross-sectional shape.

The plurality of nanostructures may have a shape dimension that is equal to or less than one-half of a wavelength of light emitted from the light source array.

The plurality of nanostructures may have an arrangement pitch that is equal to or less than one-half of a wavelength of light emitted from the light source array.

The meta-structure layer may further include a support layer configured to support the plurality of nanostructures, and the plurality of nanostructures may be on opposite sides of the support layer.

BRIEF DESCRIPTION OF THE DRAWINGS

These and/or other aspects will become apparent and more readily appreciated from the following description of some example embodiments, taken in conjunction with the accompanying drawings in which.

DETAILED DESCRIPTION

Figure 1:
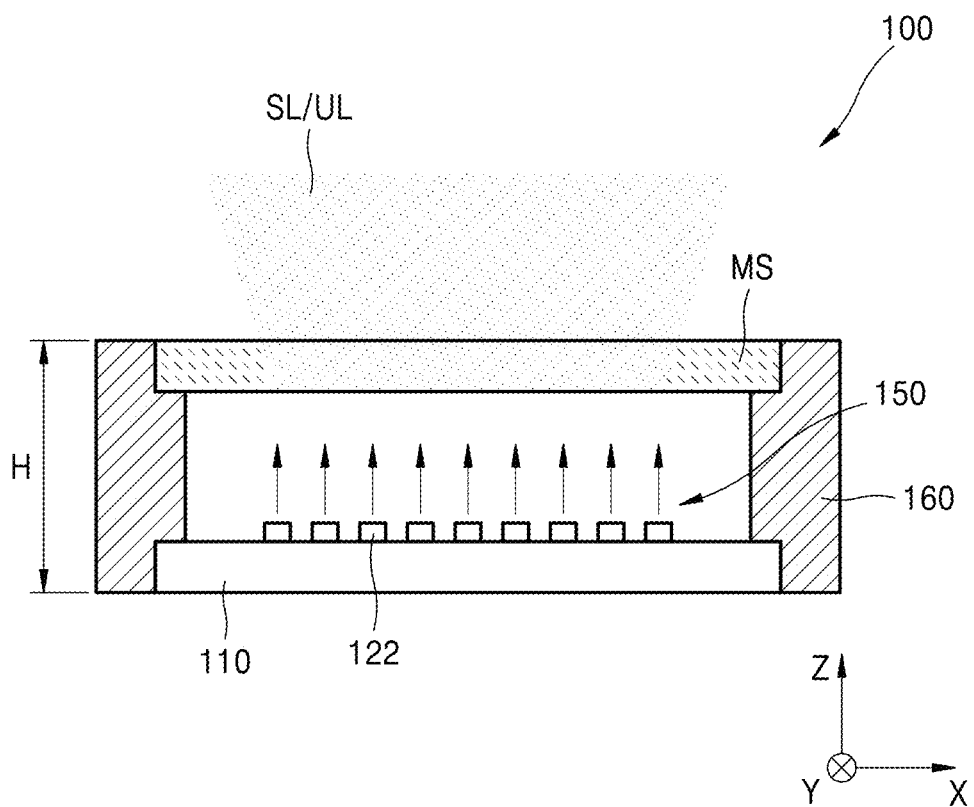
FIG. 1 is a cross-sectional view illustrating a schematic configuration of a meta projector according to some example embodiments.

Reference will now be made in detail to example embodiments, at least some of which are illustrated in the accompanying drawings, wherein like reference numerals refer to like elements throughout. In this regard, the example embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described with reference to the accompanying drawings. The embodiments described herein are for illustrative purposes only, and various modifications may be made therefrom. In the drawings, like reference numerals refer to like elements, and the sizes of elements may be exaggerated for clarity of illustration.

In the following description, when an element is referred to as being "above" or "on" another element, it may be directly on the other element while making contact with the other element or may be above the other element without making contact with the other element. Furthermore, when an element is referred to as being "on" another element, it will be understood that the element may be above or below the other element.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Although the terms "first" and "second" are used to describe various elements, these terms are only used to distinguish one element from another element. These terms do not limit elements to having different materials or structures.

As used herein, the singular forms "a," "an" and "the" are intended to include the plural forms as well, unless the context clearly indicates otherwise. It will be further understood that the terms "comprises" and/or "comprising" used herein specify the presence of stated features or elements, but do not preclude the presence or addition of one or more other features or elements.

In the present disclosure, terms such as unit or module are used to denote a unit having at least one function or operation and implemented with hardware, software, or a combination of hardware and software. Terms such as "unit" or "module" may further be used to denote an instance of hardware that is configured to perform the at least one function or operation.

The operations described in the embodiments are examples which are not intended to limit the scope of the inventive concepts. In the present disclosure, descriptions of known electric components, control systems, software, and other functional aspects thereof may not be given for conciseness. Furthermore, in the drawings, connection lines or members between elements are example functional, physical, and/or electric connections that can be replaced with or used together with other functional, physical, and/or electrical connections.

An element referred to with the definite article or a demonstrative pronoun may be construed as the element or the elements even though it has a singular form.

Operations of a method may be performed in appropriate order unless explicitly described in terms of order or described to the contrary. In addition, examples or example terms (for example, "such as" and "etc.") are used for the purpose of description and are not intended to limit the scope of the inventive concepts unless defined by the claims.

Figure 2:
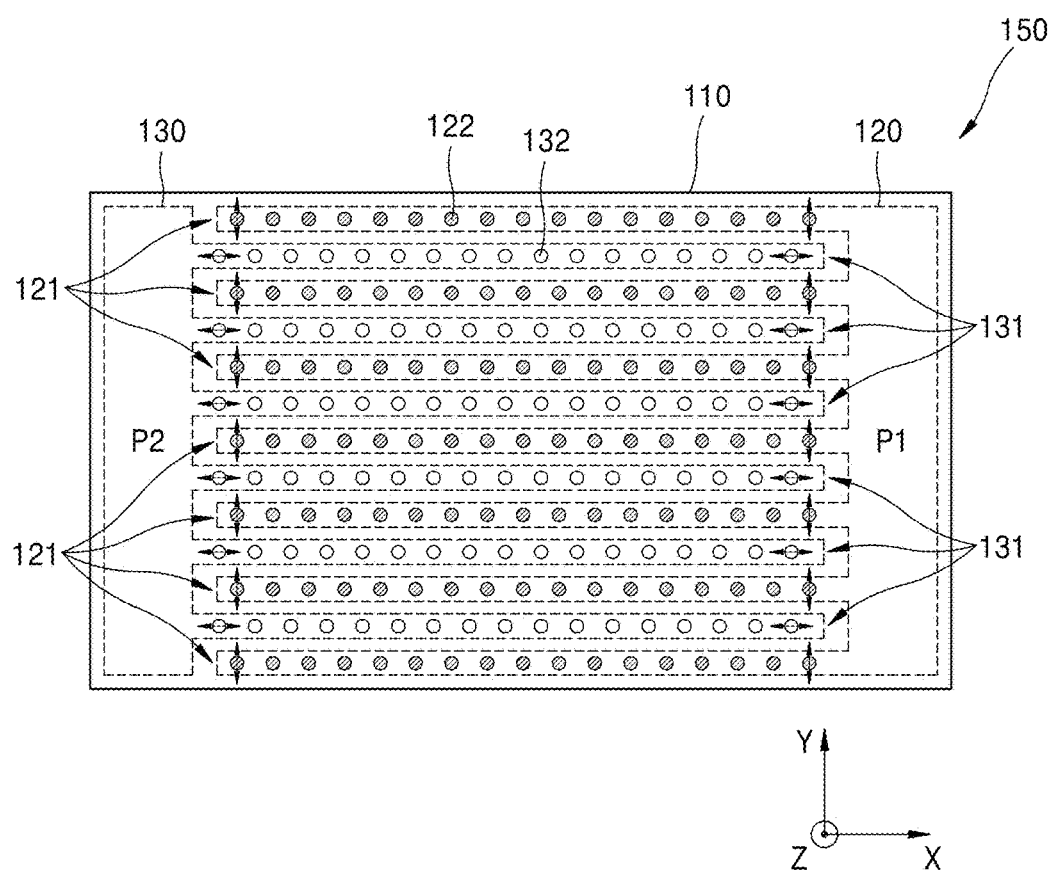
FIG. 2 is a plan view illustrating a light source array of the meta projector shown in FIG. 1.
Figure 3:
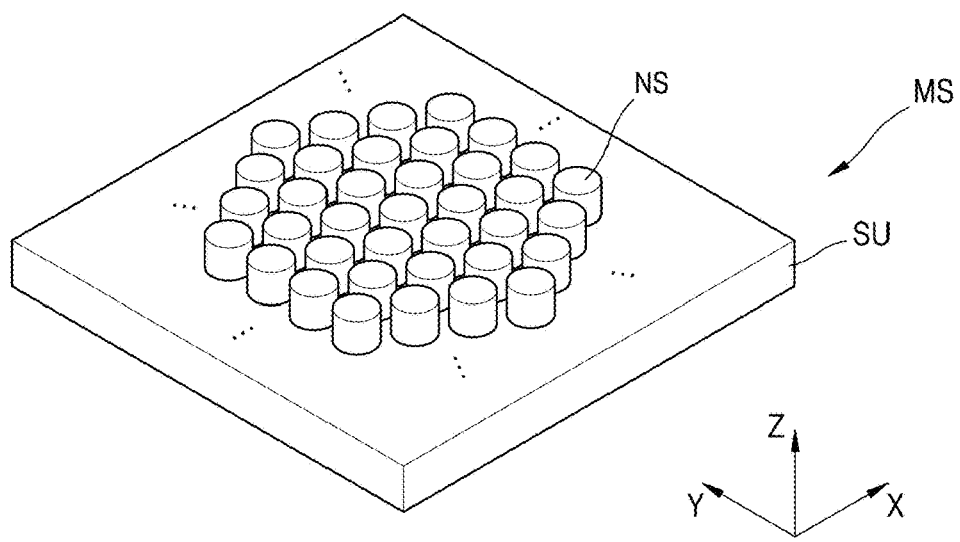
FIG. 3 is a perspective view illustrating a schematic configuration of a meta-structure layer of the meta projector shown in FIG. 1.

FIG. 1 is a cross-sectional view illustrating a schematic configuration of a meta projector 100 according to some example embodiments, FIG. 2 is a plan view illustrating a light source array 150 of the meta projector 100 shown in FIG. 1, and FIG. 3 is a perspective view illustrating a schematic configuration of a meta-structure layer MS of the meta projector 100 shown in FIG. 1.

The meta projector 100 includes: the light source array 150 having light-emitting elements configured to emit different types of light; and the meta-structure layer MS disposed on an optical path of light emitted from the light source array 150 and configured to differently modulate different types of light emitted from the light source array 150. It will be understood that the light source array 150 is configured to emit light along an optical path; by being disposed on the optical path, the meta-structure layer MS will be understood to be at least partially aligned with the optical path, such that the meta-structure layer MS is configured to at least partially receive the light emitted from the light source array 150. As referred to herein, a "type" of light may be understood to refer to light having a particular set of properties (herein "light properties"). Thus, different types of light will be understood to refer to two different instances of light, where each instance of light has a separate, distinct set of light properties. Light emitted from the light source array 150 may be modulated as structured light SL or uniform light UL while passing through the meta-structure layer MS. The meta projector 100 may further include a substrate 110 and a housing 160 fixing the light source array 150 and the meta-structure layer MS.

The light source array 150 includes: a first light-emitting array 120 in which a plurality of first light-emitting elements 122 are arranged; and a second light-emitting array 130 in which a plurality of second light-emitting elements 132 configured to emit light different in type from light emitted from the first light-emitting elements 122 are arranged. Restated, the plurality of first light-emitting elements 122 are configured to emit first light having a first set of light properties and the plurality of second light-emitting elements 132 are configured to emit a second light having a second set of light properties, where the second set of light properties are different from the first set of light properties. The first light-emitting elements 122 and the second light-emitting elements 132 may emit light having different polarization states. Restated, the first set of light properties may include a first polarization state, and the second set of light properties may include a second polarization state, where the second polarization state is different from the first polarization state. For example, the first light-emitting elements 122 may emit light having a first polarization state, and the second light-emitting elements 132 may emit light having a second polarization state that is different from the first polarization state. For example, light having the first polarization state may be light linearly polarized in a Y-axis direction, and light having the second polarization state may be light linearly polarized in an X-axis direction. The first polarization state may be a transverse-electric (TE) mode, and the second polarization state may be a transverse-magnetic (TM) mode. The first polarization state and the second polarization state may be circularly polarized states having different rotation directions. The following description will be presented assuming that the first light-emitting elements 122 emit light linearly polarized in the Y-axis direction as light having the first polarization state, and the second light-emitting elements 132 emit light linearly polarized in the X-axis direction as light having the second polarization state.

The first light-emitting array 120 includes a plurality of first columns 121 in which the first light-emitting elements 122 are arranged, and the second light-emitting array 130 includes a plurality of second columns 131 in which the second light-emitting elements 132 are arranged, wherein the first columns 121 of the first light-emitting array 120 and the second columns 131 of the second light-emitting array 130 may be alternately arranged. Restated, and as shown in at least FIG. 2, the first light-emitting array 120 may include a plurality of first columns 121, where the plurality of first columns 121 includes the plurality of first light-emitting elements 122, the second light-emitting array 130 may include a plurality of second columns 131, where the plurality of second columns 131 includes the plurality of second light-emitting elements 132, and the light source array 150 may include an alternating pattern of the first columns 121 and the second columns 131.

The first light-emitting array 120 and the second light-emitting array 130 may be controlled independently of each other. The first light-emitting array 120 may be operated according to a control signal P1, and the second light-emitting array 130 may be operated according to a control signal P2. In an operation, only the first light-emitting array 120 may emit light ("first light"), and the second light-emitting array 130 may not emit light. In another operation, only the second light-emitting array 130 may emit light ("second light"), and the first light-emitting array 120 may not emit light. In this manner, the light source array 150 may be selectively operated in a mode in which light having the first polarization state is emitted or in a mode in which light having the second polarization state is emitted.

The first and second light-emitting arrays 120 and 130 may be controlled independently of each other. In this case, not all the first light-emitting elements 122 of the first light-emitting array 120 may be simultaneously operated, or not all the second light-emitting elements 132 of the second light-emitting array 130 may be simultaneously operated. When the first light-emitting array 120 is operated, the first light-emitting elements 122 may be sequentially operated according to the first columns 121 of the first light-emitting elements 122 to emit light in a scanning manner, or the first light-emitting elements 122 may be operated in a different manner. In addition, when the second light-emitting array 130 is operated, the second light-emitting elements 132 may be sequentially operated according to the second columns 131 of the second light-emitting elements 132 to emit light in a scanning manner, or the second light-emitting elements 132 may be operated in a different manner.

The arrangement of the first and second light-emitting elements 122 and 132 of the light source array 150 is not limited to the arrangement shown in FIG. 2. For example, the first and second light-emitting elements 122 and 132 may be randomly arranged. The first and second light emitting arrays 120 and 130 may be controlled independently of each other, and may be arranged in any form enabling a generally uniform spatial distribution of output light when one of the first and second light emitting arrays 120 and 130 is operated.

The meta-structure layer MS may be configured to differently modulate different types of light (e.g., light having different sets of light properties, light having different polarization states, etc.) emitted from the light source array 150. For example, the meta-structure layer MS may convert light having the first polarization state into structured light SL and light having the second polarization state into uniform light UL.

Structured light SL refers to a distribution of beam spots formed by rays of light propagating in a space. Structured light SL generated while passing through the meta-structure layer MS may have a pattern mathematically coded to uniquely designate angular position coordinates with bright and dark points. The pattern may be used to recognize a three-dimensional shape. Structured light SL cast on a three-dimensional object may be changed in shape by the three-dimensional object, and this change may be imaged using an imaging device such as a camera to extract ("generate") depth information of ("associated with") the three-dimensional object based on tracing the degree of variation in pattern shape of the structured light SL reflected from the three-dimensional object according to coordinates.

Uniform light UL may be general illumination light that does not have a pattern that structured light SL has according to positions. Light emitted from the light source array 150 may be adjusted in beam width and equalized (referred to interchangeably as "flattened," "stabilized," "dampened," "harmonized," "homogenized," "normalized," "regularized," "standardized," "uniformized," some combination thereof, or the like) in spatial distribution while passing through the meta-structure layer MS. For example, uniform light UL may have illuminance for obtaining two-dimensional images, or may be used as general illumination light.

Referring to FIG. 3, the meta-structure layer MS includes a plurality of nanostructures NS. The nanostructures NS have a sub-wavelength shape dimension. Herein, the term "shape dimension" refers to a dimension defining the shape of the nanostructures NS such as thickness and width, and a sub-wavelength shape dimension means that at least one of such shape dimensions is smaller than the wavelength of light (e.g., first light and/or second light) emitted from the light source array 150.

The shape dimension of the nanostructures NS may be equal to or less than half ("one-half") of the wavelength of light emitted from the light source array 150. The arrangement pitch of the nanostructures NS may be equal to or less than half of the wavelength of light emitted from the light source array 150. Based on the width of the nanostructures NS being equal to or less than half of the wavelength of light, the nanostructures NS may be configured to operate as strong scattering units that form a meta-structure. As the arrangement pitch of the nanostructures NS becomes smaller than the wavelength of incident light, the nanostructures NS may be increasingly configured to control the incident light to have an intended ("particular") shape without higher-order diffraction.

Each of the nanostructures NS may have ("may be associated with") unique transmission intensity and transmission phase depending on the material and shape thereof. The phase or intensity distribution of light passing through the meta-structure layer MS may be controlled based on adjusting the particular shape distribution of the nanostructures NS. Hereinafter, the term "shape distribution" refers to at least any one of the shape, the size, the size distribution, the arrangement pitch, and the arrangement pitch distribution of the nanostructures NS.

The shape distribution of the nanostructures NS (also referred to herein as the "particular shape distribution" thereof) may be determined such that different phase distributions may be formed depending on ("based on") the polarization of light emitted from the light source array 150 and thus received at the nanostructures NS of the metal-structure layer MS. The shape distribution of the nanostructures NS may be determined such that light having the first polarization state and emitted from the first light-emitting elements 122 may be modulated as structured light SL, and light having the second polarization state and emitted from the second light-emitting elements 132 may be modulated as uniform light UL. Restated, the nanostructures NS may be configured to form structured light SL using the first light emitted from the first light-emitting array 120 based on a particular shape distribution of the nanostructures NS and form uniform light UL using the second light emitted from the second light-emitting array 130 based on the particular shape distribution of the nanostructures NS.

Although all the nanostructures NS are illustrated as having a circular cylindrical form with the same shape, size, and height, this is an example. That is, the nanostructures NS are not limited thereto. For example, the horizontal or vertical size or material of the nanostructures NS may be adjusted according to the positions of the nanostructures NS to obtain an intended transmission intensity distribution or transmission phase distribution. To obtain an intended ("particular") transmission intensity distribution or transmission phase distribution, the shape distribution of a group of a plurality of nanostructures NS may be determined according to the positions of the nanostructures NS. Restated, the nanostructures NS may be configured to generate a particular transmission intensity distribution or transmission phase distribution of light based on a particular shape distribution of at least some of the nanostructures NS. In addition, such groups of nanostructures NS may be repeatedly arranged at a particular (or, in some example embodiments, predetermined) period. The shape distribution of the nanostructures NS may be regular, periodic, or quasi-periodic. However, the shape distribution of the nanostructures NS is not limited thereto. For example, the shape distribution of the nanostructures NS may be random.

The meta-structure layer MS may further include a support layer SU supporting ("configured to support") the nanostructures NS. The support layer SU may include a material having a refractive index less than that of the nanostructures NS. For example, the support layer SU may include $SiO_2$, a transparent conductive oxide (TCO), or a polymer such as polycarbonate (PC), polystyrene (PS), or polymethylmethacrylate (PMMA).

The nanostructures NS may include a dielectric material. The nanostructures NS may include a material having a higher refractive index than the refractive index of an adjacent material such as air or the support layer SU. The difference between the refractive index of the nanostructures NS and the refractive index of the adjacent material may be 1 or greater.

The nanostructures NS may include any one of single crystal silicon, polycrystalline silicon (poly Si), amorphous silicon, $Si_3N_4$, GaP, $TiO_2$, AlSb, AlAs, AlGaAs, AlGaInP, BP, and $ZnGeP_2$.

In some example embodiments, the nanostructures NS may include a conductive material. The conductive material may be a highly conductive metallic material configured to implement surface plasmon excitation. For example, the nanostructures NS may include at least any one selected from copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au), or the nanostructures NS may include an alloy including any one of the listed elements. In addition, the nanostructures NS may include a highly conductive two-dimensional material such as graphene, or a conductive oxide.

In some example embodiments, some of the nanostructures NS may include a dielectric material having a high refractive index, and some of the nanostructures NS may include a conductive material. That is, some of the nanostructures NS may include a dielectric material having a refractive index greater than the refractive index of the substrate 110, and the other nanostructures NS may include a conductive material.

The nanostructures NS may have an asymmetric shape, including an asymmetrical cross-sectional shape. If ("based on") nanostructures NS having asymmetry in shape are employed, the above-described optical operations may be performed on light polarized in a particular direction according to asymmetry. In other words, the transmission phase distribution of light incident on each of the nanostructures NS may be varied such that structured light SL may be obtained from light having the first polarization state, and uniform light UL may be obtained from light having the second polarization state.

The cross-sectional shape of the nanostructures NS may have asymmetry. That is, the shape of cross-sections of the nanostructures NS perpendicular to a direction (Z-axis direction) in which the light source array 150 and the meta-structure layer MS are spaced apart from each other may have asymmetry. For example, the nanostructures NS may have different lengths in a polarization direction of light emitted from the first light-emitting elements 122, that is, a first polarization direction (Y-axis direction), and a polarization direction of light emitted from the second light-emitting elements 132, that is, a second polarization direction (X-axis direction). The degree of difference between the X-axis length and the Y-axis length of the nanostructures NS may vary according to the positions of the nanostructures NS. For example, the arrangement and distribution of the nanostructures NS may be determined by adjusting the length of the nanostructures NS in the Y-axis direction to form a structured light pattern using light having the first polarization direction (Y-axis direction), and similarly adjusting the length distribution of the nanostructures NS in the X-axis direction to provide uniform illumination by mixing light having the second polarization direction (X-axis direction). For example, the nanostructures NS may be designed to have a phase grating effect such that light having the first polarization direction may be diffracted at periodic angles to form a structured light pattern. The nanostructures NS may be designed to have a phase distribution like an aspherical convex lens such that light having the second polarization direction may form uniform illumination light. Since the lengths of the nanostructures NS in the X-axis and Y-axis directions have an effect on optical characteristics of light having opposite polarization directions, the shape of the nanostructures NS may be accurately determined at each position by simulating the influences of the lengths in the two directions.

The meta-structure layer MS may have an ultra-small pitch and a small thickness compared with micro-optical components of the related art, and thus may form an arbitrary pattern over a wide angular range without high order diffraction. Therefore, the meta projector 100 may have an ultra-small size. For example, the thickness H of the meta projector 100 may be about 4 mm or less.

Figure 4:
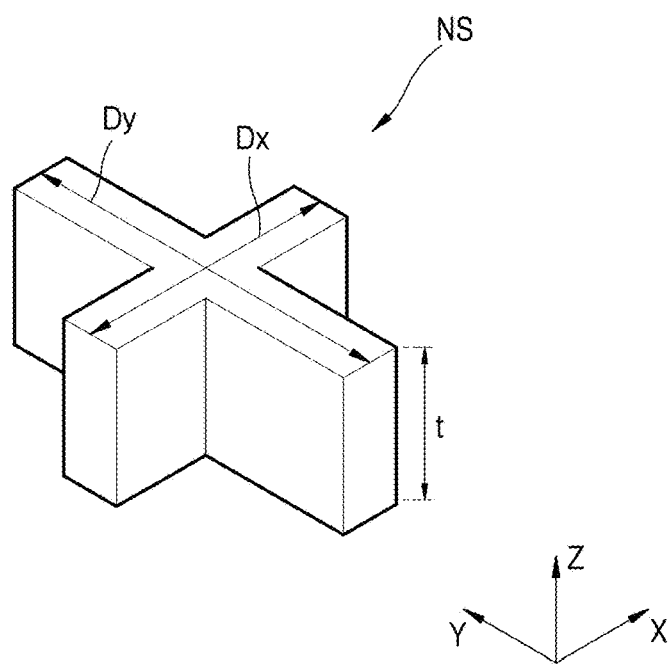
FIGS. 4, 5, and 6 are perspective views illustrating example shapes of nanostructures applicable to the meta projector of FIG. 1.
Figure 5:
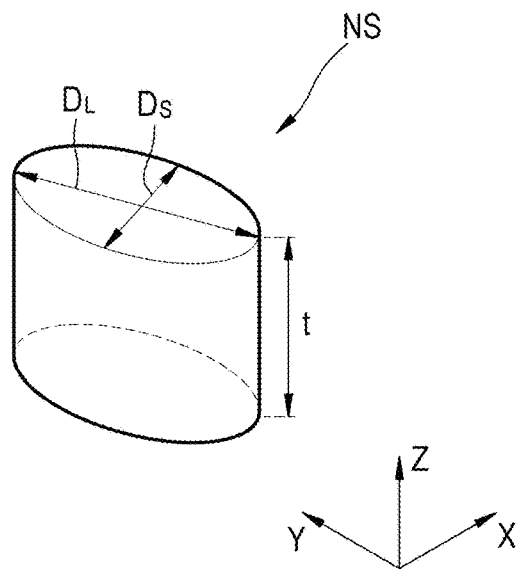
Figure 6:
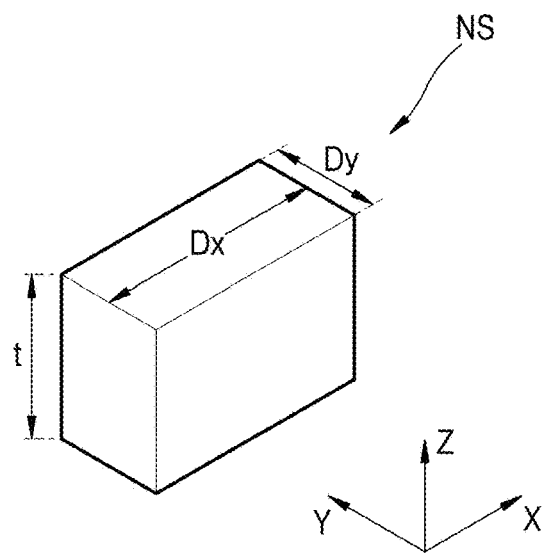

FIGS. 4, 5, and 6 are perspective views illustrating example shapes of nanostructures applicable to the meta projector 100 of FIG. 1.

Referring to FIG. 4, a nanostructure NS may have a polygonal pillar shape with a cross-shaped section parallel to an XY plane and a thickness (t). The cross-sectional shape may be an asymmetric shape with an X-axis length Dx being different from a Y-axis length Dy. The ratio of the X-axis length Dx and the Y-axis length Dy of the cross shape may vary according to the positions of nanostructures NS. In addition, the distribution of X-axis lengths Dx and the distribution of Y-axis lengths Dy of nanostructures NS may be different. The distribution of X-axis lengths Dx may be determined to form patterned light, and the distribution of Y-axis lengths Dy may be determined to form uniform light. Such asymmetrically-shaped nanostructures NS may be properly arranged according to positions to have different effects on light polarized in the X-axis direction and light polarized in the Y-axis direction.

Referring to FIG. 5, a nanostructure NS may have an asymmetric elliptical pillar shape with a cross-section parallel to an XY plane being elliptical. The nanostructure NS may have an elliptical shape with a major-axis length $D_L$ being different from a minor-axis length $D_S$, and the ratio of the major-axis length $D_L$ and the minor-axis length $D_S$ of such nanostructures NS may be varied according to the positions of the nanostructures NS to have different optical effects on light polarized in a direction parallel to the major axis and light polarized in a direction parallel to the minor axis.

Referring to FIG. 6, a nanostructure NS may have an asymmetric rectangular parallelepiped shape having a rectangular cross-section with a length $D_x$ and a width $D_y$. As in the case shown in FIGS. 4 and 5, the aspect ratio of the rectangular cross-section may be adjusted according to positions to have different optical effects on light polarized in the X-axis direction and light polarized in the Y-axis direction.

Figure 7:
FIG. 7 illustrates an example in which asymmetric nanostructures are arranged to have different effects on light having different polarization states.

FIG. 7 illustrates an example in which asymmetric nanostructures are arranged to have different effects on light having different polarization states. As shown in FIG. 7, one or more nanostructures may have an asymmetrical cross-sectional shape.

The example shows that asymmetric shapes and distribution of the asymmetric shapes may be designed according to intended optical performance. Various shape distribution designs may be configured to obtain ("generate") structured light and uniform light from light having different polarization states.

Figure 8:
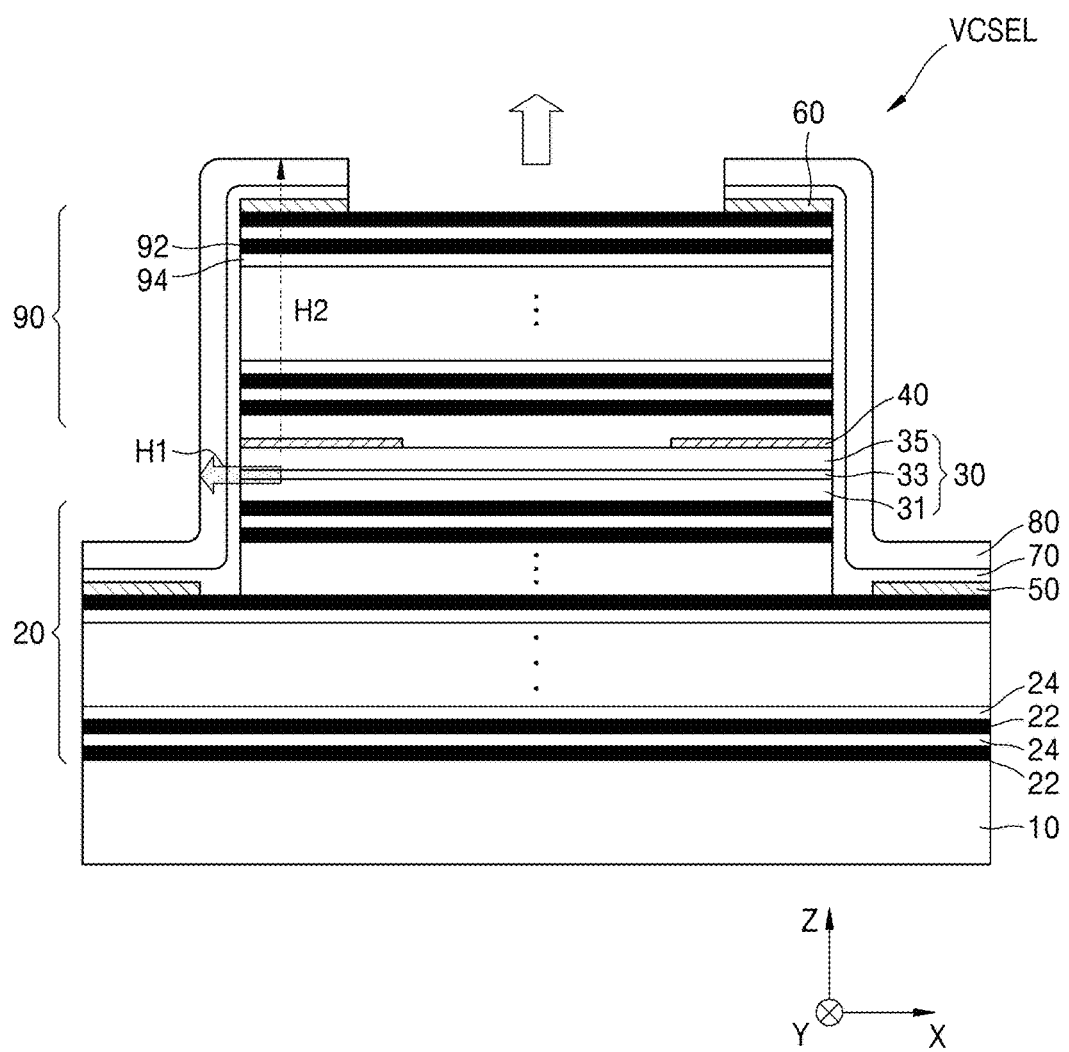
FIG. 8 is a cross-sectional view illustrating an example structure of a light-emitting element applicable to the meta projector of FIG. 1.

FIG. 8 is a cross-sectional view illustrating an example structure of light-emitting elements that may be employed in the meta projector 100 of FIG. 1.

Vertical cavity surface emitting lasers (VCSELs) may be used as the first and second light-emitting elements 122 and 132 of the meta projector 100. An example structure of VCSELs that may be used as the first and second light-emitting elements 122 and 132 will now be described.

A VCSEL includes a gain layer 30 configured to generate light, and distributed Bragg reflectors 20 and 90 arranged below and above the gain layer 30.

The gain layer 30 absorbs energy and generates light. For example, the gain layer 30 may generate light when current is injected into the gain layer 30 or pumping light is cast onto the gain layer 30. The gain layer 30 may include an active layer 33 including a semiconductor material. For example, the active layer 33 may include a group III-V semiconductor material or a group II-VI semiconductor material. The active layer 33 may have a multi-quantum well structure containing InGaAs, AlGaAs, AlGaN, InGaAsP, InGaP, AlGaInP, or the like. The active layer 33 may include quantum dots. The material that may be included in the active layer 33 is not limited to the listed materials.

The gain layer 30 may further include an upper clad layer 35 and a lower clad layer 31 that are arranged above and below the active layer 33. Each of the upper clad layer 35 and the lower clad layer 31 may include an N-type, P-type, or intrinsic semiconductor material. The upper clad layer 35 and the lower clad layer 31 may include the same semiconductor material as that included in the active layer 33 and may further include a N-type dopant and a P-type dopant, respectively.

The distributed Bragg reflectors 20 and 90 are arranged below and above the gain layer 30 to oscillate light generated in the gain layer 30 such that the light in a particular wavelength band may be amplified and then output. To this end, the reflectivity of the distributed Bragg reflectors 20 and 90 may be set to be about 90% or greater. The reflectivity of the lower distributed Bragg reflector 20 may be greater than that of the upper distributed Bragg reflector 90. For example, the reflectivity of the lower distributed Bragg reflector 20 may be about 98% or greater to output light through the upper distributed Bragg reflector 90.

The lower distributed Bragg reflector 20 may be formed by alternately repeatedly stacking first and second material layers 22 and 24 having different refractive indexes under the condition that the thickness of each material layer is about ¼ of an intended emission wavelength. The upper distributed Bragg reflector 90 may be formed by alternately repeatedly stacking first and second material layers 92 and 94 having different refractive indexes under the condition that the thickness of each material layer is about ¼ of an intended emission wavelength. The lower distributed Bragg reflector 20 may be located on a semiconductor substrate 10. The reflectivity of the lower distributed Bragg reflector 20 may be set to be an intended value by adjusting the refractive index difference between the first and second material layers 22 and 24 and the number of pairs of the first and second material layers 22 and 24 that are repeatedly stacked. The lower distributed Bragg reflector 20 may include the same material as that included in the gain layer 30. For example, the first material layers 22 may be $Al_xGa_{(1-x)}As$ layers ($0 \leq x \leq 1$), and the second material layers 24 may be $Al_yGa_{(1-y)}As$ layers ($0 \leq y \leq 1$, $x \neq y$). The lower distributed Bragg reflector 20 may be doped such that the lower distributed Bragg reflector 20 may be of the same semiconductor type as the lower clad layer 31. For example, if the lower clad layer 31 is P-type, the lower distributed Bragg reflector 20 may be doped to be P-type, and if the lower clad layer 31 is N-type, the lower distributed Bragg reflector 20 may be doped to be N-type. The material of the lower distributed Bragg reflector 20 is not limited thereto. For example, various materials configured to provide a refractive index difference may be included in the first and second material layers 22 and 24.

The VCSEL may further include an oxide aperture layer 40 to adjust the mode or beam size of light. The oxide aperture layer 40 is illustrated as being above the gain layer 30. However, the position of the oxide aperture layer 40 is not limited thereto. For example, the oxide aperture layer 40 may be located inside the lower distributed Bragg reflector 20. In addition, a plurality of oxide aperture layers 40 may be provided, or no oxide aperture layer 40 may be provided.

The VCSEL may include a first electrode 50 and a second electrode 60 that are spaced apart from each other with the gain layer 30 being therebetween to inject current into the gain layer 30. The first electrode 50 may be below the gain layer 30, and the second electrode 60 may be above the gain layer 30.

As illustrated in FIG. 8, for arrangement of the first electrode 50, the lower distributed Bragg reflector 20 may be etched to have a mesa shape. However, this is an example. In another example, the first electrode 50 may be formed on a lower surface of the lower distributed Bragg reflector 20 or the substrate 10.

The polarization of output light may be controlled by adjusting specific shapes of the first and second electrodes 50 and 60. Specific shapes of the first and second electrodes 50 and 60 may be varied to adjust a path through which current is injected into the gain layer 30 and to adjust the polarization of output light. For example, the shape of the second electrode 60 when the VCSEL is used as a first light-emitting element 122 may be different from the shape of the second electrode 60 when the VCSEL is used as a second light-emitting element 132. In addition, the shape of the first electrode 50 when the VCSEL is used as a first light-emitting element 122 may be different from the shape of the first electrode 50 when the VCSEL is used as a second light-emitting element 132. That is, one or both of the first and second electrodes 50 and 60 (lower and upper electrodes) may be varied in shape to output light having different polarization states.

In addition, an asymmetric current injection method may be used to adjust the polarization of output light. The polarization of output light may be controlled by adjusting the direction in which current is injected or varying the amount of current according to the injection direction. In this case, the shape of the second electrode 60 when the VCSEL is used as a first light-emitting element 122 may be the same as the shape of the second electrode 60 when the VCSEL is used as a second light-emitting element 132. Similarly, the shape of the first electrode 50 when the VCSEL is used as a first light-emitting element 122 may be the same as the shape of the first electrode 50 when the VCSEL is used as a second light-emitting element 132.

In addition, the VCSEL may have an asymmetric cross-sectional shape, and the polarization of output light may be adjusted by varying the direction of the asymmetric cross-sectional shape of the VCSEL. For example, the shape of a cross-section of the VCSEL parallel to the cross-section shown in FIG. 7, that is, parallel to the XY plane may be circular as shown in FIG. 2 or may be rectangular with different X-axis and Y-axis lengths. A relatively long length may be aligned in the X-axis direction or the Y-axis direction to adjust the polarization of output light.

A grating-based structure may be placed as a polarization adjusting element in a path through which light is output from the VCSEL to adjust the polarization of output light. A grating-based element may be added to output light having different polarization states when the VCSEL is used as a first light-emitting element 122 and as a second light-emitting element 132.

The VCSEL may further include a heat sink 80 to dissipate heat generated from the gain layer 30. The heat sink 80 may include a metallic material having high thermal conductivity such as copper, gold, or aluminum.

The heat sink 80 may have a shape surrounding the VCSEL. For example, as illustrated in FIG. 8, the heat sink 80 may start from an upper surface region except for a light output region and extend along a lateral surface parallel to a stacked direction of the lower distributed Bragg reflector 20 and the gain layer 30. An insulation layer 70 may be further provided ("located") between the heat sink 80, the first electrode 50, the lateral surface, and the second electrode 60. Heat generated from the gain layer 30 may be discharged to the outside through the heat sink 80. Heat generated from the gain layer 30 may be discharged through a first path H1 and a second path H2. In this case, most heat may be discharged through the first path H1 shorter than the second path H2 having a long path by the distributed Bragg reflector 90 having a relatively large thickness.

Such VCSELs having high heat dissipating efficiency and meta-structure reflectors suitable for miniaturization may be employed as the first and second light-emitting elements 122 and 132.

Figure 9:
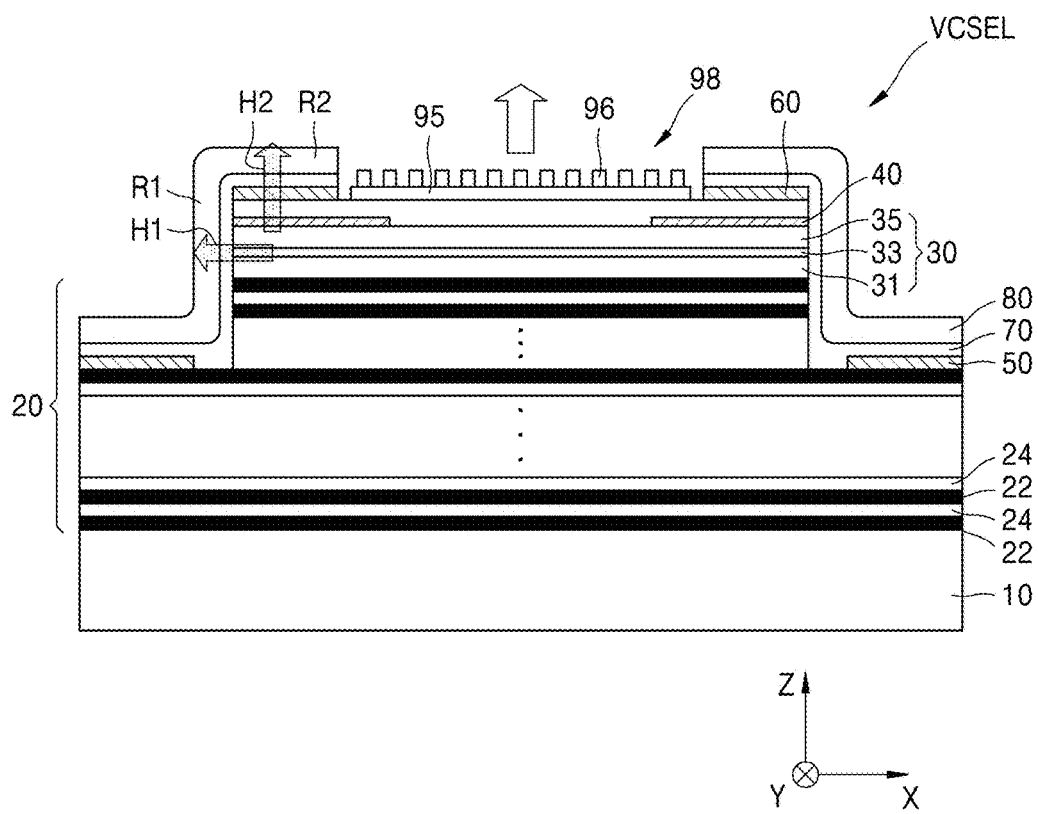
FIG. 9 is a cross-sectional view illustrating another example structure of a light-emitting element applicable to the meta projector of FIG. 1.

FIG. 9 is a cross-sectional view illustrating another example structure of a VCSEL that may be employed as a light-emitting element in the meta projector 100 of FIG. 1.

This example structure of a VCSEL is different from the structure shown in FIG. 8 in that the upper distributed Bragg reflector 90 of FIG. 8 is replaced with a meta-structure reflector 98. This structure may provide a more effective heat discharge path than the structure shown in FIG. 8, and may make it easy to reduce the volume of the meta projector 100 because the meta-structure reflector 98 having a relatively small thickness is used instead of the distributed Bragg reflector 90 having a relatively large thickness due to a large number of stacked layers.

The meta-structure reflector 98 includes a plurality of nanostructures 96 having a sub-wavelength shape dimension. The nanostructures 96 may be provided ("located") on a support layer 95. The term "sub-wavelength shape dimension" indicates that a dimension such as thickness or width defining the shape of the nanostructures 96 is less than an operational wavelength of the meta-structure reflector 98. The operational wavelength of the meta-structure reflector 98 may be in a wavelength band of light generated by a gain layer 30. Light generated by the gain layer 30 oscillates between a distributed Bragg reflector 20 and the meta-structure reflector 98 and is then output through the meta-structure reflector 98, and the operational wavelength of the meta-structure reflector 98 refers to the wavelength of the output light.

The meta-structure reflector 98 may include a semiconductor material. For example, the meta-structure reflector 98 may be entirely formed of a III-V group semiconductor compound. In addition, the composition of the compound may be adjusted to set the refractive index of the support layer 95 to be less than the refractive index of the nanostructures 96. The refractive index difference between the support layer 95 and the nanostructures 96 may be about 0.5 or greater, or about 1 or greater.

The thickness of the support layer 95 may be set to be equal to or greater than ⅕ of an emission wavelength. If the thickness of the support layer 95 is less than ⅕ of the emission wavelength, light resonating at the nanostructures 96 above the support layer 95 may be coupled to a lower layer of a semiconductor material, and thus the meta-structure reflector 98 may not be operated as a meta-structure.

The region of a heat sink 80 may be divided into a first region R1 and a second region R2. The first region R1 surrounds a lateral side of the VCSEL, and the second region R2 is connected to the first region R1 and located above the gain layer 30. That is, the second region R2 is a region of an upper surface of the VCSEL except for a region through which light is output.

A discharge path through which heat generated in the gain layer 30 is transferred to the heat sink 80 may be divided into a first path H1 extending toward the first region R1 and a second path H2 extending toward the second region R2. In the VCSEL of some example embodiments, the meta-structure reflector 98 having a relatively small thickness is located above the gain layer 30 instead of a thick distributed Bragg reflector, and thus the first path H1 and the second path H2 have similar lengths and thus similar thermal resistance. In at least a region of the gain layer 30, the second path H2 extending toward the second region R2 may be shorter than the first path H1 extending toward the first region R1. Therefore, heat generated from the gain layer 30 may be effectively distributed and discharged through the first path H1 and the second path H2.

The VCSEL may include a first electrode 50 and a second electrode 60 spaced apart from each other with the gain layer 30 being therebetween to inject current into the gain layer 30. The first electrode 50 may be positioned below the gain layer 30, and the second electrode 60 may be positioned above gain layer 30.

As described with reference to FIG. 8, in some example embodiments, the polarization of output light may be controlled by adjusting specific shapes of the first and second electrodes 50 and 60. Specific shapes of the first and second electrodes 50 and 60 may be varied to adjust a path through which current is injected into the gain layer 30 and to adjust the polarization of output light. For example, the shape of the second electrode 60 when the VCSEL is used as a first light-emitting element 122 may be different from the shape of the second electrode 60 when the VCSEL is used as a second light-emitting element 132. In addition, the shape of the first electrode 50 when the VCSEL is used as a first light-emitting element 122 may be different from the shape of the first electrode 50 when the VCSEL is used as a second light-emitting element 132. That is, one or both of the first and second electrodes 50 and 60 (lower and upper electrodes) may be varied in shape to output light having different polarization states.

In addition, as described with reference to FIG. 8, an asymmetric current injection method, a method of using an asymmetric cross-sectional shape of a VCSEL, or a method of adding a grating-based element configured to adjust the polarization of light may be used.

In some example embodiments, the shape distribution of the nanostructures 96 may be adjusted such that the meta-structure reflector 98 may have a reflector function and a polarization adjustment function as well. In this case, the nanostructures 96 of the meta-structure reflector 98 may have different shape distributions for the case of using the VCSEL as a first light-emitting element 122 and the case of using the VCSEL as a second light-emitting element 132, to output light having different polarization states.

Figure 10:
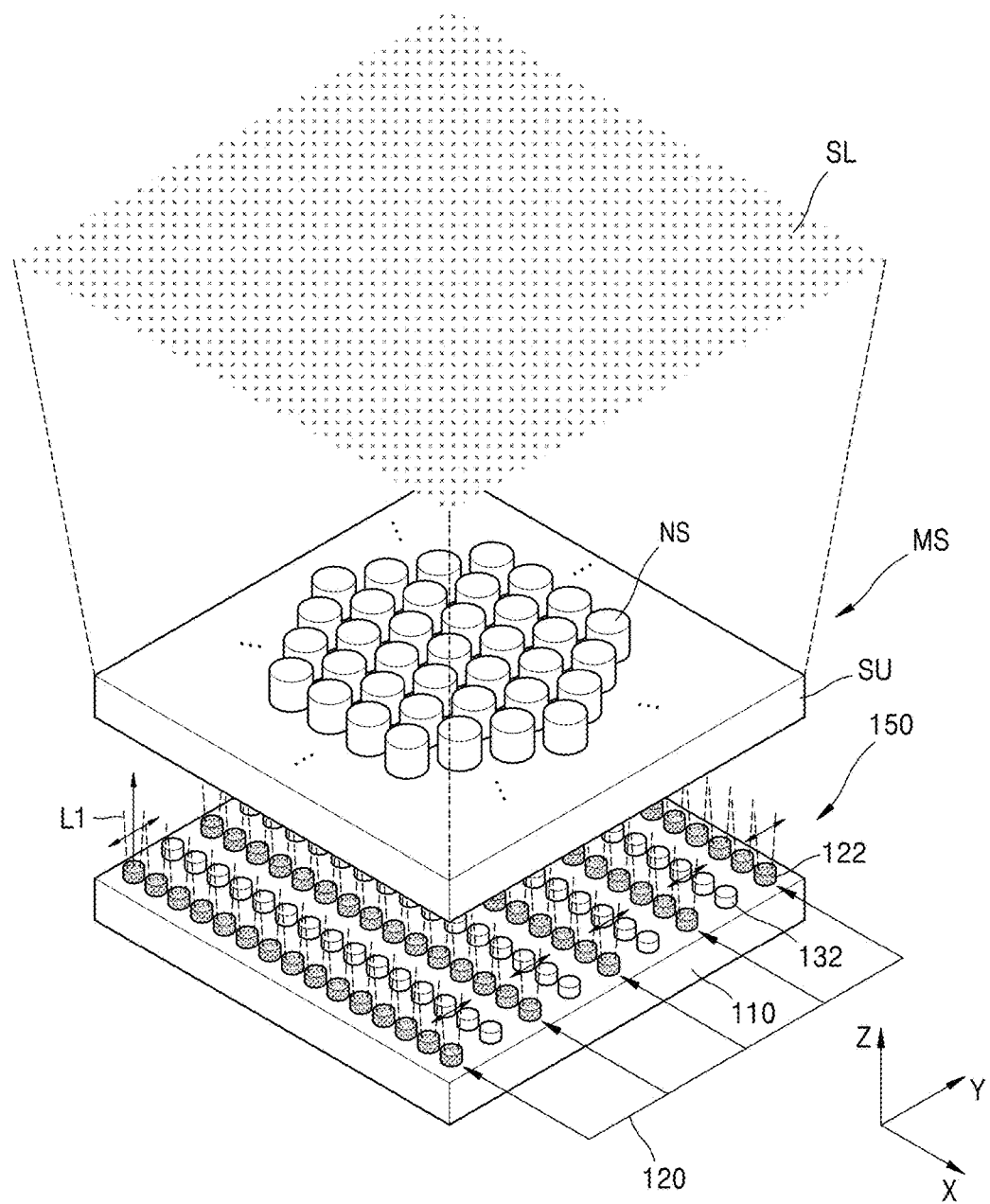
FIG. 10 is an exploded perspective view illustrating main elements of the meta projector of FIG. 1 to describe a mechanism for outputting structured light.

FIG. 10 is an exploded perspective view illustrating main elements of the meta projector 100 of FIG. 1 to describe the mechanism of outputting structured light.

Only the first light-emitting elements 122 of the first light-emitting array 120 of the light source array 150 may be operated to emit structured light SL. That is, the first light-emitting elements 122 may emit light, and the second light-emitting elements 132 may not emit light. Light L1 ("first light") having the first polarization state incident on the meta-structure layer MS from the light source array 150 forms rays of light propagating in a space. The rays of light form beam spots in a space having a certain angle. A structured light pattern is formed according to conditions of the meta-structure layer MS, that is, by the nanostructures NS designed to form a transmission phase distribution with respect to light L1 having the first polarization state.

Structured light SL generated while passing through the meta-structure layer MS may have a pattern mathematically coded to uniquely designate angular position coordinates with bright and dark points. The pattern may be used to recognize a three-dimensional shape. Structured light SL cast on a three-dimensional object may be changed in shape by the three-dimensional object, and this change may be imaged using an imaging device such as a camera to extract depth information of the three-dimensional object by tracing the degree of variation in pattern shape according to coordinates.

Figure 11:
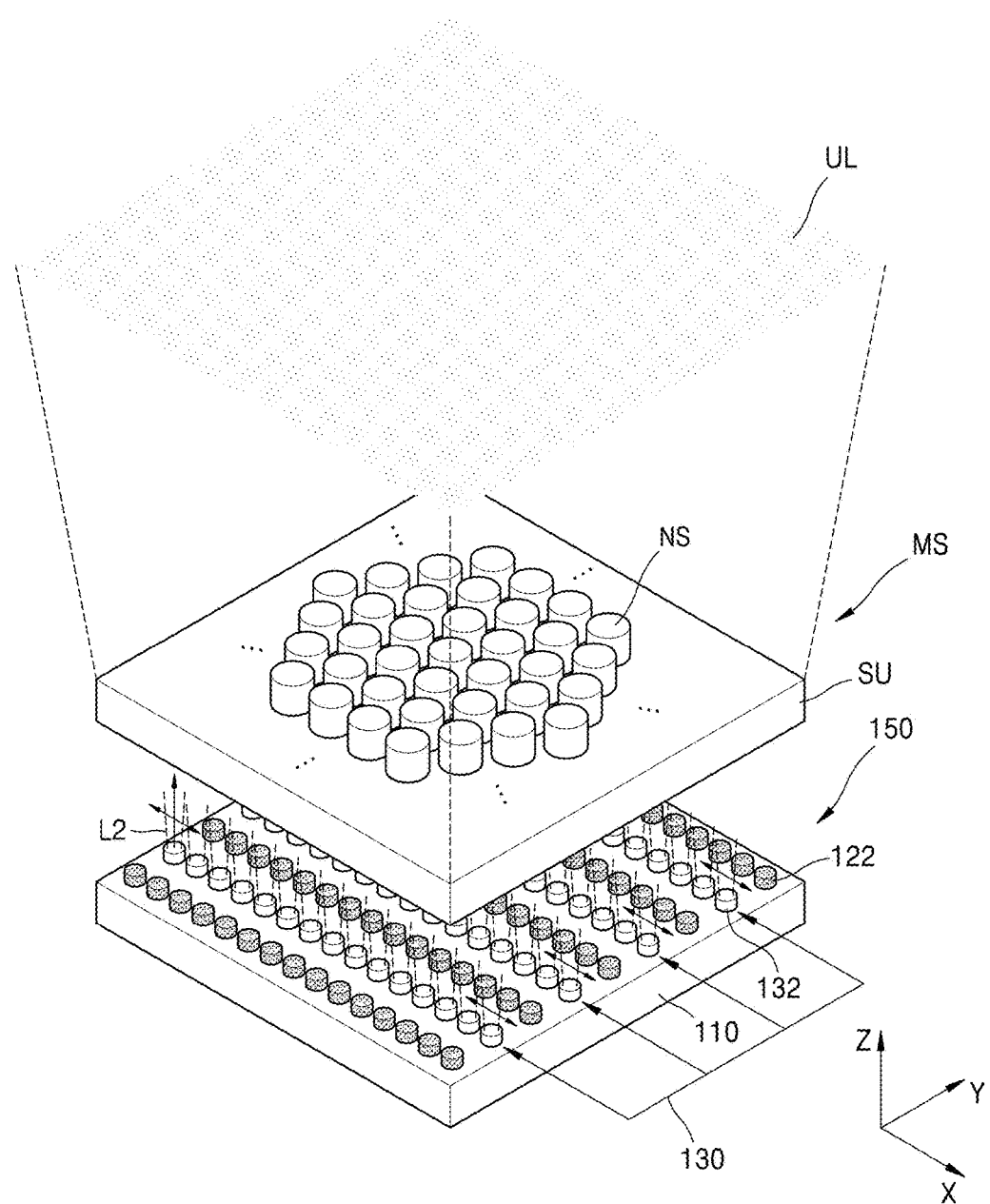
FIG. 11 is an exploded perspective view illustrating the main elements of the meta projector of FIG. 1 to describe a mechanism for outputting uniform light.

FIG. 11 is an exploded perspective view illustrating the main elements of the meta projector 100 of FIG. 1 to describe the mechanism of outputting uniform light.

Only the second light-emitting elements 132 of the second light-emitting array 130 of the light source array 150 may be operated to emit uniform light UL. That is, the second light-emitting elements 132 may emit light, and the first light-emitting elements 122 may not emit light.

Light L2 ("second light") having the second polarization state incident on the meta-structure layer MS from the light source array 150 may be output as uniform light UL by the nanostructures NS designed to form uniform illumination light by varying the beam width and the distribution of the beam width of light L2 having the second polarization state.

The uniform light UL may be general illumination light that does not have a pattern that structured light SL has according to positions. Light emitted from the light source array 150 may be adjusted in beam width and equalized in spatial distribution while passing through the meta-structure layer MS. For example, the uniform light UL may have illuminance for obtaining two-dimensional images, or may be used as general illumination light.

Figure 12:
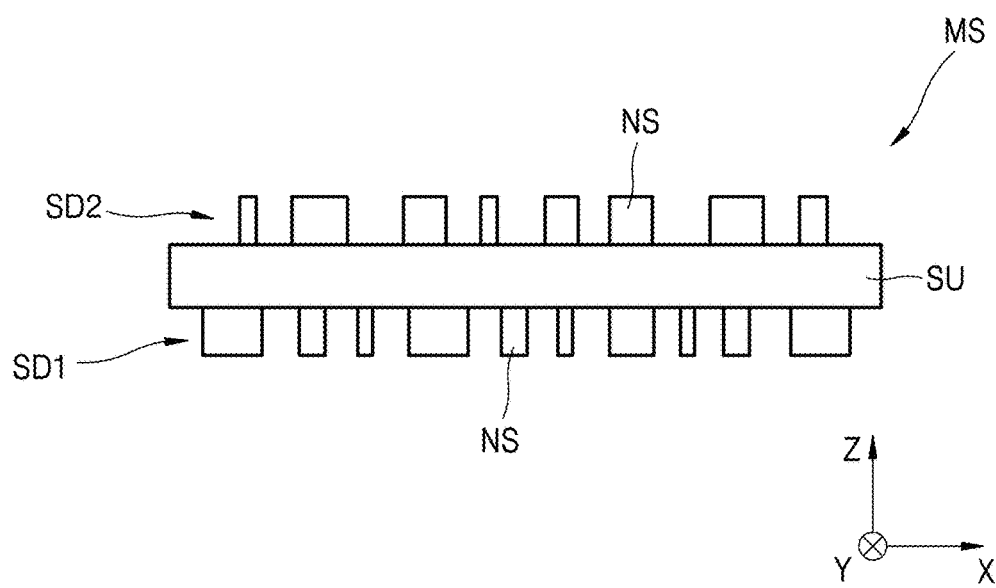
FIG. 12 is a cross-sectional view illustrating an example meta-structure layer applicable to a meta projector according to some example embodiments.

FIG. 12 is a cross-sectional view illustrating an example meta-structure layer MS applicable to a meta projector according to some example embodiments.

As shown in FIG. 12, the meta-structure layer MS may include nanostructures NS on both sides ("opposite sides") of a support layer SU. A shape distribution SD1 of the nanostructures NS arranged on a lower surface of the support layer SU may be different from a shape distribution SD2 of the nanostructures NS arranged on an upper surface of the support layer SU. The shape distribution SD1 of the nanostructures NS arranged on the lower surface of the support layer SU may be designed as a phase lens having a phase distribution like an aspherical lens for projection of light emitted from each of VCSEL light sources arranged below the nanostructures NS at a certain angle. The phase lens may be formed using a distribution of asymmetric nanostructures NS to have different lens characteristics for light having different polarization states or using symmetric nanostructures NS to have the same lens characteristics regardless of polarization states of light. The nanostructures NS arranged on the upper surface of the support layer SU may be designed to obtain a structured light pattern and uniform illumination light from light having different polarization states. Owing to this combination of the shape distributions SD1 and SD2, intended optical performance may be obtained. That is, structured light SL may be obtained from light having a first polarization state, and uniform light UL may be obtained from light having a second polarization state.

Figure 13:
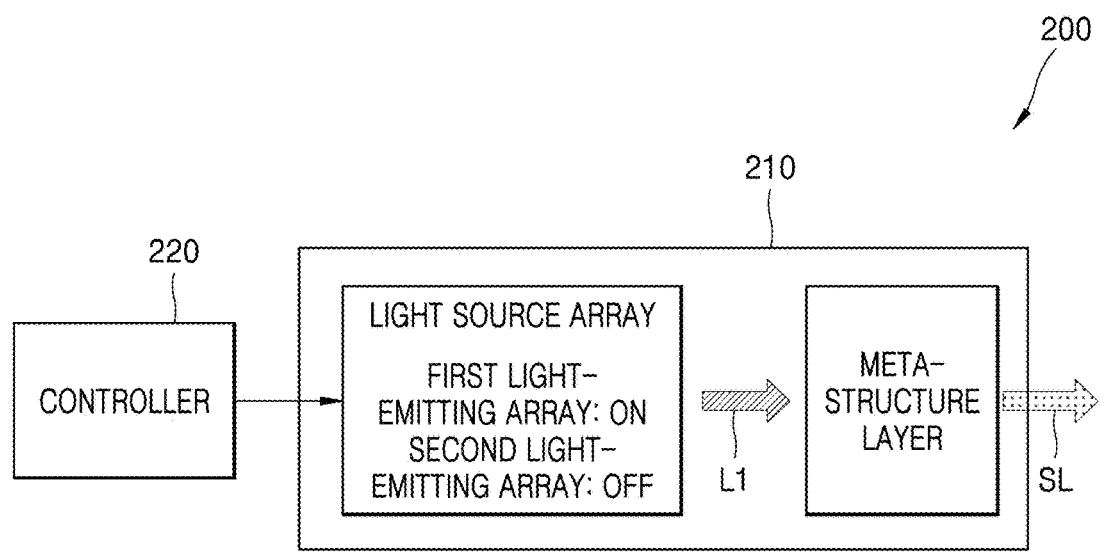
FIGS. 13 and 14 are block diagrams schematically illustrating a light source device according to some example embodiments, respectively illustrating operations for generating structured light and uniform light.
Figure 14:
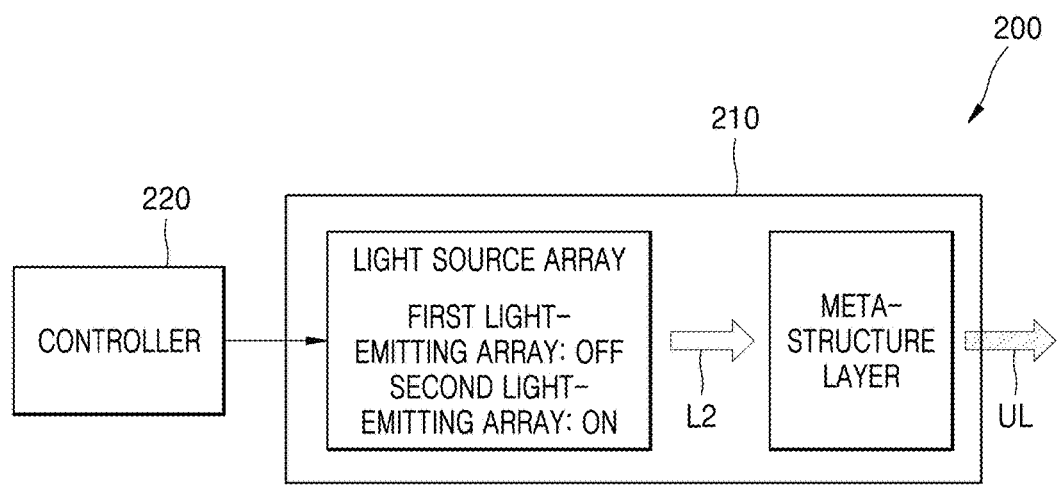

FIGS. 13 and 14 are block diagrams schematically illustrating a light source apparatus 200 according to some example embodiments, respectively illustrating operations for generating structured light and uniform light.

The light source apparatus 200 includes: a meta projector 210 having a light source array and a meta-structure layer; and a controller 220 configured to control the meta projector 210 to output structured light SL or uniform light UL.

The meta projector 100 described with reference to FIGS. 1 to 12 may be used as the meta projector 210. That is, a first light-emitting array and a second light-emitting array of a light source array may respectively output light L1 having a first polarization state and light L2 having a second polarization state. The meta-structure layer MS may form structured light SL from the light L1 having the first polarization state and uniform light UL from the light L2 having the second polarization state.

If the first light-emitting array is turned on and the second light-emitting array is turned off, as illustrated in FIG. 13, light L1 having the first polarization state is output from the light source array, and structured light SL is output through the meta-structure layer MS.

If the second light-emitting array is turned on and the first light-emitting array is turned off, as illustrated in FIG. 14, light L2 having the second polarization state is output from the light source array, and uniform light UL is output through the meta-structure layer MS.

The light source apparatus 200 may be used in various electronic apparatuses that selectively use structured light SL and uniform light UL.

Figure 15:
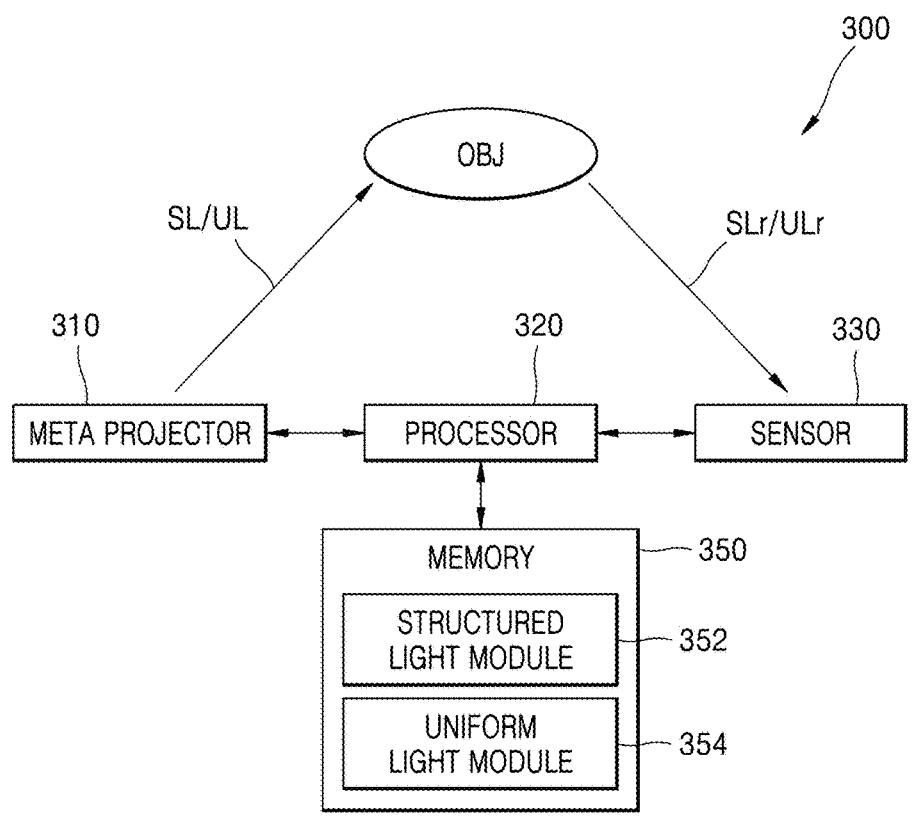
FIG. 15 is a block diagram schematically illustrating an object recognizing device according to some example embodiments.

FIG. 15 is a block diagram schematically illustrating an object recognizing apparatus 300 according to some example embodiments.

The object recognizing apparatus 300 includes: a meta projector 310 configured to emit structured light SL or uniform light UL onto an object OBJ; a sensor 330 configured to receive light reflected from the object OBJ; and a processor 320 configured to control the meta projector 310 to output structured light SL or uniform light UL and perform calculations to obtain information about the shape of the object OBJ based on light that the sensor 330 has received.

The meta projector 100 described with reference to FIGS. 1 to 12 may be used as the meta projector 310. The meta projector 310 includes a light source array configured to emit light having different characteristics and a meta-structure layer having different modulation functions with respect to light having different characteristics. The meta projector 310 may emit structured light SL or uniform light UL toward the object OBJ.

If the meta projector 310 emits structured light SL onto the object OBJ, the processor 320 may perform a calculation to obtain a three-dimensional shape of the object OBJ, and if the meta projector 310 emits uniform light UL onto the object OBJ, the processor may perform a calculation to obtain a two-dimensional shape of the object OBJ.

The object recognizing apparatus 300 may include a memory 350. A structured light module 352 and a uniform light module 354 programmed to be executed on the processor 320 may be stored in the memory 350.

The processor 320 may control the meta projector 310 to emit structured light SL by executing the structured light module 352 stored in the memory 350 and may analyze variations in a structured light pattern using light SLr incident on the sensor 330, thereby analyzing information about the three-dimensional shape of the object OBJ.

The processor 320 may control the meta projector 310 to emit uniform light UL by executing the uniform light module 354 stored in the memory 350 and may analyze information about the two-dimensional shape of the object OBJ using light ULr incident on the sensor 330.

Figure 16:
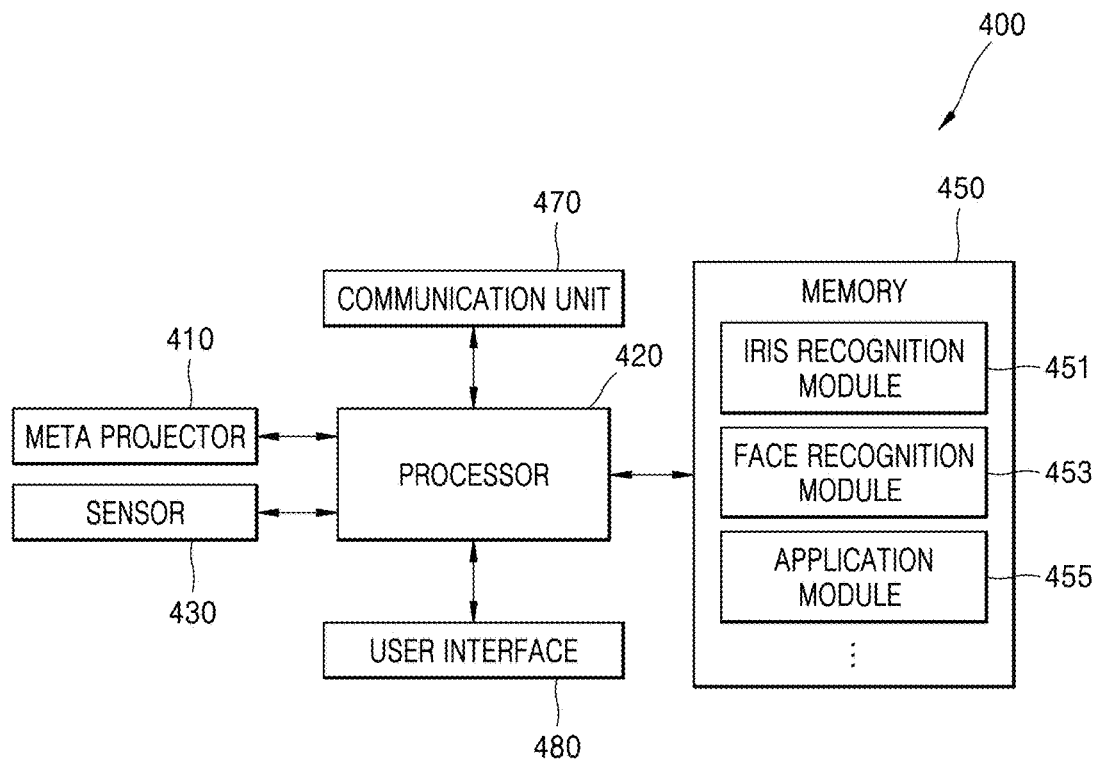
FIG. 16 is a block diagram schematically illustrating an electronic apparatus according to some example embodiments.

FIG. 16 is a block diagram schematically illustrating an electronic apparatus 400 according to some example embodiments.

The electronic apparatus 400 includes: a meta projector 410 configured to emit light onto an object for performing user authentication; a sensor 430 configured to receive light reflected from the object; and a processor 420 configured to analyze the light incident on the sensor 430 to determine whether to authenticate a user.

The meta projector 100 described with reference to FIGS. 1 to 12 may be used as the meta projector 410. The meta projector 410 includes a light source array configured to emit light having different characteristics and a meta-structure layer having different modulation functions with respect to light having different characteristics. The meta projector 310 may emit structured light or uniform light toward the object OBJ. The object onto which light is cast for user authentication may be the face of a user or the iris of a user's eye.

The processor 420 may control the meta projector 410 according to a user's input or an input from an application program of the electronic apparatus 400.

If the meta projector 410 emits structured light onto the object, the processor 420 may use a face recognition method for authentication, and if the meta projector 410 emits uniform light onto the object, the processor 420 may use an iris recognition method for authentication.

The electronic apparatus 400 includes a memory 450. An iris recognition module 451, a face recognition module 453, and an application module 455 that are programmed to be executed by the processor 420 may be stored in the memory 450. In addition, data for executing the iris recognition module 451, the face recognition module 453, and the application module 455 may be stored in the memory 450.

The processor 420 may execute the face recognition module 453 in response to a signal input by a user or the application module 455. Then, the processor 420 may accordingly control the meta projector 410 to emit structured light and may analyze light incident on the sensor 430 by a three-dimensional analysis method to recognize the face of the user. Analyzed facial data may be compared with facial data previously stored in the memory 450 to determine whether to authenticate the user.

The processor 420 may execute the iris recognition module 451 in response to a signal input by a user or the application module 455. Then, the processor 420 may accordingly control the meta projector 410 to emit uniform light and may analyze light incident on the sensor 430 to recognize the iris of a user's eye. Analyzed iris data may be compared with iris data previously stored in the memory 450 to determine whether to authenticate the user.

In addition, the memory 450 may further store modules, such as a communication module, a camera module, a video replay module, or an audio replay module, as programs for operating devices included in the electronic apparatus 400.

The memory 450 may include at least one type of recording medium selected from a flash memory, a hard disk, a micro multimedia card, a memory card (e.g., a secure digital (SD) card or an extreme digital (XD) card, random access memory (RAM), static random access memory (SRAM), read-only memory (ROM), electrically erasable programmable read-only memory (EEPROM), programmable read-only memory (PROM), a magnetic memory, a magnetic disk, or an optical disk.

In addition, the electronic apparatus 400 may further include a communication unit 470 and a user interface 480.

The communication unit 470 may communicate with external devices by a method such as Bluetooth communication, Bluetooth low energy (BLE) communication, near field communication, wireless local area network (WLAN) communication, ZigBee communication, infrared data association (IrDA) communication, Wi-Fi direct (WFD) communication, ultra wideband (UWB) communication, Ant+ communication, or Wi-Fi communication. However, the communication unit 470 is not limited thereto.

The user interface 480 may include a display panel, a keyboard, a touch panel, or buttons.

For example, the electronic apparatus 400 may be a portable mobile communication device, a smart phone, a smart watch, a personal digital assistant (PDA), a laptop, a personal computer (PC), a smart refrigerator, a mobile computing device, or a non-mobile computing device. However, the electronic apparatus 400 is not limited thereto.

In some example embodiments, methods embodied as software modules or algorithms in the electronic apparatus 400 may be stored on a computer-readable recording medium as non-transitory computer-readable codes or program commands executable by the processor 420. Examples of the computer-readable recording medium include magnetic storage media (e.g., ROM, RAM, floppy disks, hard disks, etc.), optical recording media (e.g., CD-ROMs, or DVDs), and the like. The computer-readable recording medium can also be distributed over network-coupled computer systems so that the computer-readable codes may be stored and executed in a distributed fashion. The medium can be read by a computer, stored in a memory, and executed by a processor.

Figure 17:
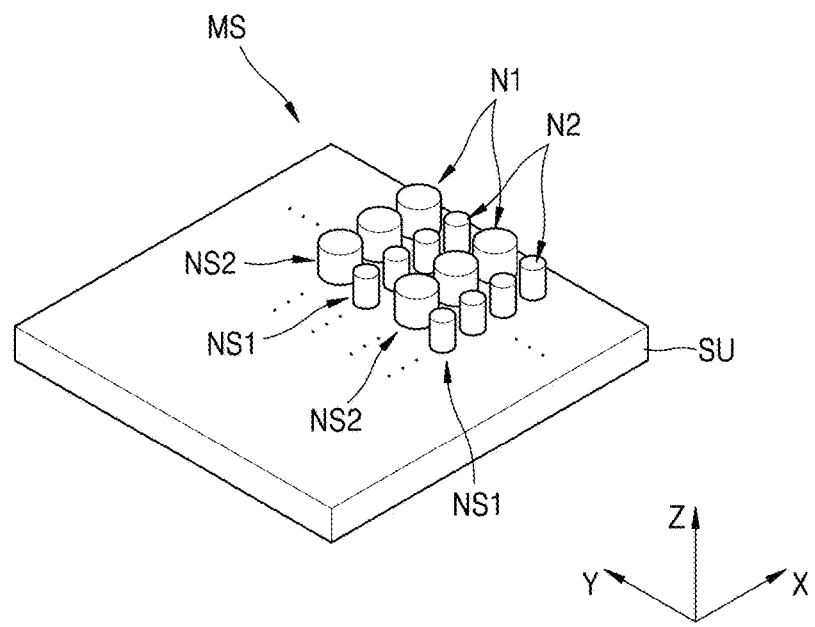
FIG. 17 is a perspective view illustrating a schematic configuration of a meta-structure layer of the meta projector shown in FIG. 1 according to some example embodiments.

FIG. 17 is a perspective view illustrating a schematic configuration of a meta-structure layer MS of the meta projector 100 shown in FIG. 1 according to some example embodiments.

Referring to FIG. 17, the meta-structure layer MS includes multiple, separate pluralities of nanostructures having different sub-wavelength shape dimensions. In particular, the meta-structure layer MS includes a first plurality of nanostructures NS1 having a first sub-wavelength shape dimension that is smaller than a wavelength of light emitted from the light source array 150 and a second plurality of nanostructures NS2 having a second sub-wavelength shape dimension that is smaller than a wavelength of light emitted from the light source array 150, there the second sub-wavelength shape dimension is different from the first sub-wavelength shape dimension. For example, as shown in FIG. 17, the first plurality of nanostructures NS1 have a smaller diameter and thickness than the second plurality of nanostructures NS2.

As further shown in FIG. 17, the first and second pluralities of nanostructures NS1 and NS2 are respectively arranged into multiple separate "sets" of nanostructures. A given "set" of nanostructures may be a "column" of nanostructures. For example, as shown in FIG. 17, the first plurality of nanostructures NS1 may include a plurality of first sets N1 of nanostructures and the second plurality of nanostructures NS2 may include a plurality of second sets N2 of nanostructures, where the first sets N1 and second sets N2 are alternating. Referring back to FIG. 12, the first plurality of nanostructures NS1 and the second plurality of nanostructures NS2 may be on opposite sides of the support layer SU, respectively.

Still referring to FIG. 17, the first plurality of nanostructures NS1 and the second plurality of nanostructures NS2 may be collectively configured to form structured light SU using the first light emitted from the first light-emitting array 120 based on a first shape distribution of the first plurality of nanostructures NS1 and a second shape distribution of the second plurality of nanostructures NS2. In addition, the first plurality of nanostructures NS1 and the second plurality of nanostructures NS2 may be collectively configured to form uniform light UL using the second light emitted from the second light-emitting array 130 based on the first shape distribution of the first plurality of nanostructures and the second shape distribution of the second plurality of nanostructures. Restated, the first and second pluralities of nanostructures NS1 and NS2 may be collectively configured to differently modulate the first light and the second light in relation to each other. As described further above, the first and second light may have different sets of light properties.

Each of the first plurality of nanostructures NS1 and the second plurality of nanostructures NS2 may have ("may be associated with") separate, respective sets of transmission intensity and transmission phase depending on the material and shape thereof. The phase or intensity distribution of light passing through the meta-structure layer MS may be controlled based on adjusting the particular shape distribution of the first and second pluralities of nanostructures NS1 and NS2. Hereinafter, the term "shape distribution" refers to at least any one of the shape, the size, the size distribution, the arrangement pitch, and the arrangement pitch distribution of the first and second pluralities of nanostructures NS1 and NS2.

The first and second pluralities of nanostructures NS may include one or more different materials, for example different dielectric materials. The first plurality of nanostructures NS1 may include a first material having a first refractive index that is higher than the refractive index of an adjacent material such as air or the support layer SU, and the second plurality of nanostructures NS2 may include a second material having a second refractive index that is higher than the refractive index of an adjacent material such as air or the support layer SU, where the first and second materials are different from each other and the first and second refractive indexes are different from each other. The difference between each refractive index of the first and second refractive indexes and the refractive index of the adjacent material may be 1 or greater.

The first and second pluralities of nanostructures NS1 and NS2 may include any one of single crystal silicon, polycrystalline silicon (poly Si), amorphous silicon, $Si_3N_4$, GaP, $TiO_2$, AlSb, AlAs, AlGaAs, AlGaInP, BP, and $ZnGeP_2$.

In some example embodiments, the first and second nanostructures NS1 and NS2 may include one or more conductive materials, where the conductive material of the first plurality of nanostructures NS1 may be different from the conductive material of the second plurality of nanostructures NS2. The one or more conductive materials may be a highly conductive metallic material configured to implement surface plasmon excitation. For example, the first and second pluralities of nanostructures NS1 and NS2 may include at least any one selected from copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au), or the nanostructures NS may include an alloy including any one of the listed elements. In addition, the first and second pluralities of nanostructures NS1 and NS2 may include one or more highly conductive two-dimensional material such as graphene, or a conductive oxide.

In some example embodiments, the first plurality of nanostructures NS1 may include a dielectric material having a high refractive index, and the second plurality of nanostructures NS2 may include a conductive material. That is, the first plurality of nanostructures NS1 may include a dielectric material having a refractive index greater than the refractive index of the substrate 110, and the second plurality of nanostructures NS2 may include a conductive material.

As described above, according to some example embodiments, the meta projector may selectively form structured light or uniform light UL by using a light source array having a plurality of light sources configured to emit different types of light and a meta-structure layer having sub-wavelength nanostructures.

The meta projector may be used as a light source to selectively perform three-dimensional shape recognition or two-dimensional shape recognition.

The meta projector may be employed in various electronic apparatuses for recognizing three-dimensional shapes or two-dimensional shapes and performing functions such as an authentication function based on the recognized shapes.

It should be understood that example embodiments described herein should be considered in a descriptive sense only and not for purposes of limitation. Descriptions of features or aspects within each example embodiment should typically be considered as available for other similar features or aspects in other embodiments.

While the meta projectors and the electronic apparatuses have been described according to embodiments with reference to the figures, it will be understood by those of ordinary skill in the art that various changes in form and details may be made therein without departing from the spirit and scope as defined by the following claims.

What is claimed is:
1. A meta projector comprising:
    a light source array configured to emit light along an optical path, the light source array including:

a first light-emitting array including a plurality of first light-emitting elements configured to emit first light having a first polarization state, and
a second light-emitting array including a plurality of second light-emitting elements configured to emit a second light having a second polarization state, the second polarization state different from the first polarization state; and
a meta-structure layer at least partially aligned with the optical path, the meta-structure layer including a plurality of nanostructures having a sub-wavelength shape dimension that is smaller than a wavelength of light emitted from the light source array, the meta-structure layer configured to differently modulate the first light and the second light in relation to each other,
wherein the meta-structure layer has a particular shape distribution of the plurality of nanostructures, the particular shape distribution being configured to:
form structured light using the first light having the first polarization state, and
form uniform light using the second light having the second polarization state.

2. The meta projector of claim 1, wherein the first light-emitting array includes a plurality of first columns, the plurality of first columns including the plurality of first light-emitting elements,
the second light-emitting array includes a plurality of second columns, the plurality of second columns including the plurality of second light-emitting elements, and
the light source array includes an alternating pattern of the first columns and the second columns.

3. The meta projector of claim 1, wherein the plurality of nanostructures include a material having a refractive index greater than a refractive index of a material adjacent to the plurality of nanostructures.

4. The meta projector of claim 3, wherein a refractive index difference between the plurality of nanostructures and the material adjacent to the nanostructures is 1 or greater.

5. The meta projector of claim 1, wherein the plurality of nanostructures include a conductive material.

6. The meta projector of claim 1, wherein the plurality of nanostructures are configured to form different transmission phase distributions according to a polarization of light emitted from the light source array, based on a particular shape distribution of the plurality of nanostructures.

7. The meta projector of claim 1, wherein the plurality of nanostructures has an asymmetrical cross-sectional shape.

8. The meta projector of claim 1, wherein the plurality of nanostructures have a shape dimension that is equal to or less than one-half of the wavelength of light emitted from the light source array.

9. The meta projector of claim 1, wherein the plurality of nanostructures have an arrangement pitch that is equal to or less than one-half of the wavelength of light emitted from the light source array.

10. The meta projector of claim 1, wherein the meta-structure layer further includes a support layer configured to support the plurality of nanostructures, and
the plurality of nanostructures are on opposite sides of the support layer.

11. A light source apparatus comprising:
a light source array configured to emit light along an optical path, the light source array including:
a first light-emitting array including a plurality of first light-emitting elements configured to emit first light having a first polarization state, and
a second light-emitting array including a plurality of second light-emitting elements configured to emit second light having a second polarization state, the second polarization state different from the first polarization state;
a meta-structure layer at least partially aligned with the optical path, the meta-structure layer including a plurality of nanostructures having a sub-wavelength shape dimension that is smaller than a wavelength of light emitted from the light source array,
wherein the meta-structure layer has a particular shape distribution of the plurality of nanostructures, the particular shape distribution being configured to:
form structured light using the first light having the first polarization state, and
form uniform light using the second light having the second polarization state; and
a controller configured to perform a control operation to selectively drive one light-emitting array of the first light-emitting array and the second light-emitting array.

12. An object recognizing apparatus comprising:
a meta projector configured to emit structured light or uniform light onto an object;
a sensor configured to receive light reflected from the object;
a processor configured to:
control the meta projector to emit structured light or uniform light, and
process the light received at the sensor to generate information indicating a shape of the object,
wherein the meta projector includes:
a light source array configured to emit light, the light source array including
a first light-emitting array including a plurality of first light-emitting elements configured to emit first light having a first polarization state, and
a second light-emitting array including a plurality of second light-emitting elements configured to emit second light having a second polarization state, the second polarization state different from the first polarization state; and
a meta-structure layer including a plurality of nanostructures having a sub-wavelength shape dimension that is smaller than a wavelength of light emitted from the light source array,
wherein the meta-structure layer has a particular shape distribution of the plurality of nanostructures, the particular shape distribution of the plurality of nanostructures being configured to:
form structured light using the first light having the first polarization state, and
form uniform light using the second light having the second polarization state.

13. The object recognizing apparatus of claim 12, wherein the processor is configured to:
process the light received at the sensor to determine a three-dimensional shape of the object, based on controlling the meta projector to emit the structured light onto the object, such that the light received at the sensor is based on reflection of at least some of the structured light from the object, and
process the light received at the sensor to determine a two-dimensional shape of the object, based on controlling the meta projector to emit the uniform light onto the object, such that the light received at the sensor is based on reflection of at least some of the uniform light from the object.

14. An electronic apparatus comprising:
a meta projector configured to emit light onto an object to enable user authentication;
a sensor configured to receive light reflected from the object;
a processor configured to analyze the received light to determine whether to authenticate a user,
wherein the meta projector includes:
a light source array configured to emit light along an optical path, the light source array including
a first light-emitting array including a plurality of first light-emitting elements configured to emit first light having a first polarization state, and
a second light-emitting array including a plurality of second light-emitting elements configured to emit a second light having a second polarization state, the second polarization state being different from the first polarization state; and
a meta-structure layer at least partially aligned with the optical path, the meta-structure layer including a plurality of nanostructures having a sub-wavelength shape dimension that is smaller than a wavelength of light emitted from the light source array,
wherein the meta-structure layer has a particular shape distribution of the plurality of nanostructures, the particular shape distribution of the plurality of nanostructures being configured to:
form structured light using the first light having the first polarization state, and
form uniform light using the second light having the second polarization state.

15. The electronic apparatus of claim 14, wherein the processor is configured to control the meta projector according to a user interaction with a user interface or an execution of an application of the electronic apparatus to selectively operate one light-emitting array of the first light-emitting array and the second light-emitting array.

16. The electronic apparatus of claim 15, wherein the processor is configured to:
implement a face recognition method to enable user authentication based on the meta projector emitting structured light onto the object, and
implement an iris recognition method to enable user authentication based on the meta projector emitting uniform light onto the object.

17. A meta projector comprising:
a light source array configured to emit light along an optical path, the light source array including:
a first light-emitting array including a plurality of first light-emitting elements configured to emit first light having a first polarization state, and
a second light-emitting array including a plurality of second light-emitting elements configured to emit a second light having a second polarization state, the second polarization state different from the first polarization state; and
a meta-structure layer at least partially aligned with the optical path, the meta-structure layer including:
a first plurality of nanostructures having a first sub-wavelength shape dimension that is smaller than a wavelength of light emitted from the light source array, and
a second plurality of nanostructures having a second sub-wavelength shape dimension that is smaller than the wavelength of light emitted from the light source array, the second sub-wavelength shape dimension different from the first sub-wavelength shape dimension
wherein the meta-structure layer has a first shape distribution of the first plurality of nanostructures and a second shape distribution of the second plurality of nanostructures, the first shape distribution of the first plurality of nanostructures and the second shape distribution of the second plurality of nanostructures being configured to:
form structured light using the first light having the first polarization state, and
form uniform light using the second light having the second polarization state.

18. The meta projector of claim 17, wherein the first light-emitting array includes a plurality of first columns, the plurality of first columns including the plurality of first light-emitting elements,
the second light-emitting array includes a plurality of second columns, the plurality of second columns including the plurality of second light-emitting elements, and
the light source array includes an alternating pattern of the first columns and the second columns.

19. The meta projector of claim 17, wherein the first plurality of nanostructures include a first material having a first refractive index greater than a refractive index of a material adjacent to the first plurality of nanostructures, and
the second plurality of nanostructures include a second material having a second refractive index greater than the refractive index of the material adjacent to the first plurality of nanostructures, the second refractive index different from the first refractive index.

20. The meta projector of claim 17, wherein the meta-structure layer further includes a support layer configured to support the first plurality of nanostructures and the second plurality of nanostructures, and
the first plurality of nanostructures and the second plurality of nanostructures are on opposite sides of the support layer, respectively.

21. A meta projector comprising:
a meta-structure layer configured to receive light emitted by light-emitting elements of a light source array, the meta-structure layer including a plurality of nanostructures having a sub-wavelength shape dimension that is smaller than a wavelength of the light received from the light source array, such that the meta-structure layer is configured to differently modulate received light having different polarizations,
wherein the meta-structure layer has a particular shape distribution of the plurality of nanostructures, the particular shape distribution of the plurality of nanostructures being configured to:
form structured light using received light having a polarization state, and
form uniform light using received light having a second polarization state different from the first polarization state.

22. The meta projector of claim 21, wherein the plurality of nanostructures include a material having a refractive index greater than a refractive index of a material adjacent to the plurality of nanostructures.

23. The meta projector of claim 22, wherein a refractive index difference between the plurality of nanostructures and the material adjacent to the nanostructures is 1 or greater.

24. The meta projector of claim 21, wherein the plurality of nanostructures include a conductive material.

25. The meta projector of claim 21, wherein the plurality of nanostructures are configured to form different transmission phase distributions according to a polarization of light emitted from the light source array, based on a particular shape distribution of the plurality of nanostructures.

26. The meta projector of claim 21, wherein the plurality of nanostructures has an asymmetrical cross-sectional shape.

27. The meta projector of claim 21, wherein the plurality of nanostructures have a shape dimension that is equal to or less than one-half of a wavelength of light emitted from the light source array.

28. The meta projector of claim 21, wherein the plurality of nanostructures have an arrangement pitch that is equal to or less than one-half of a wavelength of light emitted from the light source array.

29. The meta projector of claim 21, wherein the metastructure layer further includes a support layer configured to support the plurality of nanostructures, and
 the plurality of nanostructures are on opposite sides of the support layer.

* * * * *